US011088902B1

(12) United States Patent
Palavalli et al.

(10) Patent No.: US 11,088,902 B1
(45) Date of Patent: Aug. 10, 2021

(54) SYNCHRONIZATION OF LOGICAL NETWORK STATE BETWEEN GLOBAL AND LOCAL MANAGERS

(71) Applicant: VMware, Inc., Palo Alto, CA (US)

(72) Inventors: Amarnath Palavalli, Cupertino, CA (US); Suresh Muppala, Cupertino, CA (US); Ganesan Chandrashekhar, Campbell, CA (US); Medhavi Dhawan, Saratoga, CA (US); Josh Dorr, San Jose, CA (US); Alexander Rogozinsky, Hayward, CA (US)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 16/906,921

(22) Filed: Jun. 19, 2020

Related U.S. Application Data

(60) Provisional application No. 63/005,765, filed on Apr. 6, 2020.

(51) Int. Cl.
*G06F 15/177* (2006.01)
*H04L 12/24* (2006.01)
*H04L 12/26* (2006.01)

(52) U.S. Cl.
CPC ...... *H04L 41/0803* (2013.01); *H04L 41/0853* (2013.01); *H04L 41/0893* (2013.01); *H04L 43/0805* (2013.01)

(58) Field of Classification Search
CPC ............. H04L 41/0803; H04L 41/0853; H04L 41/0893; H04L 43/0805

(Continued)

(56) References Cited

U.S. PATENT DOCUMENTS

| 6,219,699 B1 | 4/2001 | McCloghrie et al. |
| 7,502,884 B1 | 3/2009 | Shah et al. |

(Continued)

FOREIGN PATENT DOCUMENTS

| CN | 102124456 A | 7/2011 |
| CN | 103650433 A | 3/2014 |

(Continued)

OTHER PUBLICATIONS

Author Unknown, "Apache Cassandra™ 1.2 Documentation," Jan. 13, 2013, 201 pages, DataStax.

(Continued)

*Primary Examiner* — Alicia Baturay
(74) *Attorney, Agent, or Firm* — Adeli LLP

(57) ABSTRACT

Some embodiments provide a method for a global manager that manages a logical network configuration for multiple datacenters that each have a local manager for managing the logical network configuration within the datacenter. Based on detecting that a connection to a particular local manager of a particular datacenter has been restored after a period of unavailability, the method identifies a portion of the logical network configuration that is relevant to the particular datacenter. In a series of transactions, the method transfers the identified portion of the logical network configuration to the particular local manager. During the series of transactions, the method identifies modifications to the identified portion of the logical network configuration to be included in the series of transactions. Upon completion of the series of transactions, the method transfers a notification to the particular local manager indicating completion of the series of transactions.

24 Claims, 11 Drawing Sheets

(58) Field of Classification Search
USPC ........................................................ 709/220
See application file for complete search history.

(56) References Cited

U.S. PATENT DOCUMENTS

| | | | |
|---|---|---|---|
| 7,802,000 B1 | 9/2010 | Huang et al. | |
| 8,479,275 B1 | 7/2013 | Naseh | |
| 8,611,351 B2 | 12/2013 | Gooch et al. | |
| 8,625,616 B2 | 1/2014 | Vobbilisetty et al. | |
| 8,660,129 B1 | 2/2014 | Brendel et al. | |
| 8,707,417 B1 | 4/2014 | Liang et al. | |
| 9,330,161 B2 | 5/2016 | D'Amato et al. | |
| 9,432,215 B2 | 8/2016 | Stabile et al. | |
| 9,602,312 B2 | 3/2017 | Koponen et al. | |
| 9,755,965 B1 | 9/2017 | Yadav et al. | |
| 9,825,851 B2 | 11/2017 | Agarwal et al. | |
| 9,923,811 B2 | 3/2018 | Agarwal et al. | |
| 10,091,028 B2* | 10/2018 | Koponen | H04L 12/66 |
| 10,120,668 B2* | 11/2018 | Palavalli | G06F 9/44578 |
| 10,162,656 B2* | 12/2018 | Palavalli | G06F 21/53 |
| 10,205,771 B2* | 2/2019 | Palavalli | H04L 41/5054 |
| 10,241,820 B2* | 3/2019 | Lambeth | H04L 41/0806 |
| 10,243,797 B2* | 3/2019 | Lambeth | H04L 41/06 |
| 10,243,834 B1 | 3/2019 | Shekhar et al. | |
| 10,243,846 B2* | 3/2019 | Jiang | H04L 12/4641 |
| 10,243,848 B2* | 3/2019 | Agarwal | H04L 49/25 |
| 10,339,123 B2 | 7/2019 | Venkatesh et al. | |
| 10,382,529 B2 | 8/2019 | Wan et al. | |
| 10,579,945 B2* | 3/2020 | Gaurav | H04L 41/5029 |
| 10,673,752 B2* | 6/2020 | Agarwal | H04L 49/70 |
| 10,832,224 B2* | 11/2020 | Palavalli | G06Q 10/06314 |
| 10,880,158 B2* | 12/2020 | Lambeth | H04L 41/0803 |
| 10,880,170 B2 | 12/2020 | Wang et al. | |
| 10,908,938 B2* | 2/2021 | Palavalli | G06Q 30/04 |
| 10,942,788 B2* | 3/2021 | Palavalli | H04L 41/0893 |
| 2002/0029270 A1 | 3/2002 | Szczepanek | |
| 2002/0093952 A1 | 7/2002 | Gonda | |
| 2002/0131414 A1 | 9/2002 | Hadzic | |
| 2003/0167333 A1 | 9/2003 | Kumar et al. | |
| 2003/0185151 A1 | 10/2003 | Kurosawa et al. | |
| 2003/0185152 A1 | 10/2003 | Nederveen et al. | |
| 2003/0188114 A1 | 10/2003 | Lubbers et al. | |
| 2003/0188218 A1 | 10/2003 | Lubbers et al. | |
| 2004/0052257 A1 | 3/2004 | Abdo et al. | |
| 2005/0288040 A1 | 12/2005 | Charpentier et al. | |
| 2006/0092976 A1 | 5/2006 | Lakshman et al. | |
| 2006/0179243 A1 | 8/2006 | Fields et al. | |
| 2006/0179245 A1 | 8/2006 | Fields et al. | |
| 2006/0221720 A1 | 10/2006 | Reuter | |
| 2006/0251120 A1 | 11/2006 | Arimilli et al. | |
| 2006/0287842 A1 | 12/2006 | Kim | |
| 2007/0217419 A1 | 9/2007 | Vasseur | |
| 2007/0239987 A1 | 10/2007 | Hoole et al. | |
| 2008/0013474 A1 | 1/2008 | Nagarajan et al. | |
| 2008/0049646 A1* | 2/2008 | Lu | H04L 45/00 370/254 |
| 2008/0104302 A1 | 5/2008 | Carpio | |
| 2008/0133729 A1 | 6/2008 | Fridman et al. | |
| 2008/0268847 A1 | 10/2008 | Mukherjee et al. | |
| 2008/0301379 A1 | 12/2008 | Pong | |
| 2009/0070337 A1 | 3/2009 | Romem et al. | |
| 2009/0193297 A1 | 7/2009 | Williams et al. | |
| 2009/0241192 A1 | 9/2009 | Thomas | |
| 2009/0279536 A1 | 11/2009 | Unbehagen et al. | |
| 2009/0279545 A1 | 11/2009 | Moonen | |
| 2009/0296726 A1 | 12/2009 | Snively et al. | |
| 2010/0250784 A1 | 9/2010 | Henry et al. | |
| 2010/0257263 A1 | 10/2010 | Casado et al. | |
| 2010/0275199 A1 | 10/2010 | Smith et al. | |
| 2010/0322255 A1 | 12/2010 | Hao et al. | |
| 2011/0032898 A1 | 2/2011 | Kazmi et al. | |
| 2011/0047218 A1 | 2/2011 | Nojima et al. | |
| 2011/0051714 A1 | 3/2011 | Somes | |
| 2011/0085569 A1 | 4/2011 | Gnanasekaran et al. | |
| 2011/0188509 A1 | 8/2011 | Kern et al. | |
| 2011/0231602 A1 | 9/2011 | Woods et al. | |
| 2011/0299413 A1 | 12/2011 | Chatwani et al. | |
| 2012/0084406 A1 | 4/2012 | Kumbalimutt | |
| 2012/0120964 A1* | 5/2012 | Koponen | H04L 41/0816 370/409 |
| 2012/0147898 A1 | 6/2012 | Koponen et al. | |
| 2012/0275328 A1 | 11/2012 | Iwata et al. | |
| 2013/0018947 A1* | 1/2013 | Archer | G06F 15/781 709/204 |
| 2013/0024579 A1 | 1/2013 | Zhang et al. | |
| 2013/0042242 A1 | 2/2013 | Kagan | |
| 2013/0044636 A1 | 2/2013 | Koponen et al. | |
| 2013/0044641 A1 | 2/2013 | Koponen et al. | |
| 2013/0044761 A1 | 2/2013 | Koponen et al. | |
| 2013/0058250 A1 | 3/2013 | Casado et al. | |
| 2013/0058335 A1 | 3/2013 | Koponen et al. | |
| 2013/0058350 A1 | 3/2013 | Fulton | |
| 2013/0058354 A1 | 3/2013 | Casado et al. | |
| 2013/0058358 A1 | 3/2013 | Fulton et al. | |
| 2013/0060819 A1 | 3/2013 | Lambeth et al. | |
| 2013/0060940 A1* | 3/2013 | Koponen | H04L 45/00 709/225 |
| 2013/0074065 A1 | 3/2013 | McNeeney et al. | |
| 2013/0103817 A1 | 4/2013 | Koponen et al. | |
| 2013/0132533 A1 | 5/2013 | Padmanabhan et al. | |
| 2013/0144992 A1 | 6/2013 | Barabash et al. | |
| 2013/0159637 A1 | 6/2013 | Forgette et al. | |
| 2013/0212212 A1 | 8/2013 | Addepalli et al. | |
| 2013/0215769 A1 | 8/2013 | Beheshti-Zavareh et al. | |
| 2013/0254328 A1 | 9/2013 | Inoue et al. | |
| 2013/0287026 A1 | 10/2013 | Davie | |
| 2013/0301425 A1 | 11/2013 | Udutha et al. | |
| 2013/0301501 A1 | 11/2013 | Olvera-Hemandez et al. | |
| 2013/0308641 A1 | 11/2013 | Ackley | |
| 2014/0064104 A1 | 3/2014 | Nataraja et al. | |
| 2014/0075002 A1 | 3/2014 | Pradhan et al. | |
| 2014/0136908 A1 | 5/2014 | Maggiari et al. | |
| 2014/0146817 A1 | 5/2014 | Zhang | |
| 2014/0172939 A1 | 6/2014 | McSherry et al. | |
| 2014/0211661 A1 | 7/2014 | Gorkemli et al. | |
| 2014/0241356 A1 | 8/2014 | Zhang et al. | |
| 2014/0250220 A1 | 9/2014 | Kapadia et al. | |
| 2014/0301391 A1 | 10/2014 | Krishnan et al. | |
| 2014/0337500 A1 | 11/2014 | Lee | |
| 2015/0009797 A1* | 1/2015 | Koponen | H04L 63/0263 370/216 |
| 2015/0009808 A1 | 1/2015 | Bejerano et al. | |
| 2015/0016276 A1 | 1/2015 | Decusatis et al. | |
| 2015/0100704 A1 | 4/2015 | Davie et al. | |
| 2015/0103842 A1 | 4/2015 | Chandrashekhar et al. | |
| 2015/0103843 A1 | 4/2015 | Chandrashekhar et al. | |
| 2015/0106804 A1 | 4/2015 | Chandrashekhar et al. | |
| 2015/0117216 A1 | 4/2015 | Anand et al. | |
| 2015/0154330 A1 | 6/2015 | Yachide et al. | |
| 2015/0195126 A1 | 7/2015 | Vasseur et al. | |
| 2015/0229641 A1* | 8/2015 | Sun | H04L 49/70 726/1 |
| 2015/0263946 A1* | 9/2015 | Tubaltsev | H04L 49/354 370/392 |
| 2015/0312326 A1* | 10/2015 | Archer | G06F 9/5027 709/226 |
| 2016/0134528 A1 | 5/2016 | Lin et al. | |
| 2016/0173338 A1 | 6/2016 | Wolfing | |
| 2016/0359705 A1 | 12/2016 | Parandehgheibi et al. | |
| 2016/0380815 A1 | 12/2016 | Agarwal et al. | |
| 2016/0380891 A1 | 12/2016 | Agarwal et al. | |
| 2016/0380925 A1 | 12/2016 | Agarwal et al. | |
| 2017/0048110 A1 | 2/2017 | Wu et al. | |
| 2017/0048130 A1 | 2/2017 | Goliya et al. | |
| 2017/0104720 A1 | 4/2017 | Bansal et al. | |
| 2017/0163532 A1 | 6/2017 | Tubaltsev et al. | |
| 2017/0222873 A1 | 8/2017 | Lee et al. | |
| 2017/0249195 A1 | 8/2017 | Sadana et al. | |
| 2017/0264483 A1* | 9/2017 | Lambeth | H04L 41/0806 |
| 2017/0331711 A1 | 11/2017 | Duda | |
| 2018/0062881 A1 | 3/2018 | Chandrashekhar et al. | |
| 2019/0207847 A1 | 7/2019 | Agarwal et al. | |

(56) References Cited

U.S. PATENT DOCUMENTS

2019/0363975 A1 11/2019 Djernaes
2020/0106744 A1 4/2020 Miriyala et al.
2020/0296035 A1* 9/2020 Agarwal ............... H04L 45/586

FOREIGN PATENT DOCUMENTS

| CN | 103890751 A | 6/2014 |
|---|---|---|
| EP | 1154601 A1 | 11/2001 |
| EP | 1635506 A1 | 3/2006 |
| EP | 1868318 A1 | 12/2007 |
| EP | 3016331 A1 | 5/2016 |
| EP | 3314831 A1 | 5/2018 |
| WO | 2010028364 A1 | 3/2010 |
| WO | 2012113444 A1 | 8/2012 |
| WO | 2013152716 A1 | 10/2013 |
| WO | 2015054671 A2 | 4/2015 |
| WO | 2017003881 A1 | 1/2017 |

OTHER PUBLICATIONS

Author Unknown, "OpenFlow Switch Specification, Version 1.1.0 Implemented (Wire Protocol 0x02)," Feb. 28, 2011, 56 pages, Open Networking Foundation.
Berde, Pankaj, et al., "ONOS Open Network Operating System an Open-Source Distributed SDN OS," Dec. 19, 2013, 34 pages.
Guo, Yingya, et al., "Traffic Engineering in SDN/OSPF Hybrid Network," The 22nd IEEE International Conference on Network Protocols (ICNP 2014), Oct. 21-24, 2014, 6 pages, IEEE, The Research Triangle, North Carolina, USA.
Hanna, Jeremy, "How ZooKeeper Handles Failure Scenarios," http://.apache.org/hadoop/Zookeeper/FailureScenarios. Dec. 9, 2010, 1 page.
Heller, Brandon, et al., "The Controller Placement Problem," Hot Topics in Software Defined Networks, Aug. 13, 2012, 6 pages, Helsinki, Finland.
Jin, Xin, et al. "Dynamic Scheduling of Network Updates," SIGCOMM'14, Aug. 17-22, 2014, 12 pages, ACM, Chicago, IL, USA.
Krishnaswamy, Umesh, et al., "ONOS Open Network Operating System—An Experimental Open-Source Distributed SDN OS," Apr. 16, 2013, 24 pages.
Lebresne, Sylvain, "[Release] Apache Cassandra 1.2 released," Jan. 2, 2013, 1 page.
Mahalingham, Mallik, et al., "VXLAN: A Framework for Overlaying Virtualized Layer 2 Networks over Layer 3 Networks," draft-mahalingham-dutt-dcops-vxlan-02.txt Internet Draft, Aug. 22, 2012, 20 pages, Internet Engineering Task Force.
Mahalingham, Mallik, et al., "VXLAN: A Framework for Overlaying Virtualized Layer 2 Networks over Layer 3 Networks," draft-mahalingham-dutt-dcops-vxlan-00.txt Internet Draft, Aug. 26, 2011, 20 pages, Internet Engineering Task Force.
Non-Published Commonly Owned U.S. Appl. No. 16/888,851, filed Jun. 1, 2020, 72 pages, Nicira, Inc.
Non-Published Commonly Owned U.S. Appl. No. 16/906,889, filed Jun. 19, 2020, 125 pages, VMware, Inc.
Non-Published Commonly Owned U.S. Appl. No. 16/906,891, filed Jun. 19, 2020, 125 pages, VMware, Inc.
Non-Published Commonly Owned U.S. Appl. No. 16/906,893, filed Jun. 19, 2020, 126 pages, VMware, Inc.
Non-Published Commonly Owned U.S. Appl. No. 16/906,901, filed Jun. 19, 2020, 125 pages, VMware, Inc.
Non-Published Commonly Owned U.S. Appl. No. 16/906,902, filed Jun. 19, 2020, 126 pages, VMware, Inc.
Non-Published Commonly Owned U.S. Appl. No. 16/906,905, filed Jun. 19, 2020, 126 pages, VMware, Inc.
Non-Published Commonly Owned U.S. Appl. No. 16/906,908, filed Jun. 19, 2020, 125 pages, VMware, Inc.
Non-Published Commonly Owned U.S. Appl. No. 16/906,913, filed Jun. 19, 2020, 124 pages, VMware, Inc.
Non-Published Commonly Owned U.S. Appl. No. 16/906,925, filed Jun. 19, 2020, 111 pages, VMware, Inc.
Non-Published Commonly Owned U.S. Appl. No. 16/906,929, filed Jun. 19, 2020, 113 pages, VMware, Inc.
Non-Published Commonly Owned U.S. Appl. No. 16/906,934, filed Jun. 19, 2020, 112 pages, VMware, Inc.
Non-Published Commonly Owned U.S. Appl. No. 16/906,935, filed Jun. 19, 2020, 114 pages, VMware, Inc.
Non-Published Commonly Owned U.S. Appl. No. 16/906,942, filed Jun. 19, 2020, 127 pages, VMware, Inc.
Non-Published Commonly Owned U.S. Appl. No. 16/906,944, filed Jun. 19, 2020, 128 pages, VMware, Inc.
Non-Published Commonly Owned U.S. Appl. No. 16/906,950, filed Jun. 19, 2020, 128 pages, VMware, Inc.
Non-Published Commonly Owned U.S. Appl. No. 16/906,955, filed Jun. 19, 2020, 127 pages, VMware, Inc.
Non-Published Commonly Owned U.S. Appl. No. 16/906,960, filed Jun. 19, 2020, 128 pages, VMware, Inc.
Non-Published Commonly Owned U.S. Appl. No. 16/906,964, filed Jun. 19, 2020, 126 pages, VMware, Inc.
Non-Published Commonly Owned U.S. Appl. No. 16/906,966, filed Jun. 19, 2020, 128 pages, VMware, Inc.
PCT International Search Report and Written Opinion of Commonly Owned International Patent Application PCT/US2021/015967, dated May 18, 2021, 13 pages, International Searching Authority (EP).
PCT International Search Report and Written Opinion of commonly owned International Patent Application PCT/US2021/015968, dated Apr. 23, 2021, 14 pages, International Searching Authority (EP).

* cited by examiner

SYNCHRONIZATION OF LOGICAL NETWORK STATE BETWEEN GLOBAL AND LOCAL MANAGERS

BACKGROUND

Today, the centralized management of virtualized environments by a single, primary manager (e.g., VMware NSX manager) has allowed for centralization of security policy management, increases in mobility of workloads (e.g., migration of virtual machines (VMs) without having to reconfigure the VMs), centralized management of universal objects (e.g., universal logical switches), etc. While the centralized management of these virtualized environments has allowed for extensions of networks, limits on these extensions still remain. As more networks move to the cloud, it is more common for one entity to have their networks span multiple sites. The extension of the primary manager into multiple sites that are self-contained but linked via a logical network brings with it various challenges.

BRIEF SUMMARY

Some embodiments provide a method for providing logical network configuration data from a global manager that manages a logical network spanning multiple datacenters to a local manager that manages the logical network at a particular one of the datacenters. Based on determining that the particular local manager requires a transfer of the full logical network configuration data for the particular datacenter (e.g., because connection to the particular local manager has been restored after a period of unavailability), the global manager identifies a portion of the logical network configuration that is relevant to the particular datacenter and transfers this portion to the particular local manager in a series of transactions. During the series of transactions (which may take place over a substantial period of time, depending on the amount of the logical network configuration data to be transferred), the global manager identifies any modifications to the identified portion of the logical network configuration, and includes these modifications as part of the series of transactions. Once the series of transactions is completed, the global manager transfers a notification to the particular local manager indicating completion of the series of transactions, so that the particular local manager is aware that the entire logical network configuration (including any changes made during that time period) has been transferred.

To transfer the identified portion of the logical network configuration to the particular local manager, in some embodiments, the global manager captures a state of the identified portion of the logical network configuration at a particular time, in a series of segments. Each captured segment, in some embodiments, is added to a queue of items to be transferred to the particular local manager, and, subsequently, transferred from the queue to the particular local manager in the series of transactions. In some embodiments, the series of segments is captured over a period of time and added to the queue as they are captured.

The global manager, in some embodiments, identifies the modifications to the identified portion of the logical network configuration during the period of time in which the series of segments is captured. In some embodiments, the modifications are added to the queue as the modifications are identified (i.e., in real-time or near real-time). The captured segments include sections of tables representing the logical network state (e.g., logical router tables, logical switch tables, security group tables, policy rule tables, etc.), while the modifications include change log entries that specify changes to the sections of tables, according to some embodiments. The queue, in some embodiments, includes start and end markers to indicate start and end times of the period of time during which the capturing of the segments, and the subsequent transfer, occurs. In some embodiments, the end marker represents the notification that is transferred to the particular local manger to indicate completion of the series of transactions.

Once the local manager receives and processes each transaction in the series of transactions from the global manager and receives the notification indicating completion of the series of transactions, in some embodiments the local manager merges the received series of transactions (including the modifications), into a set of logical network configuration data for the datacenter. After the transactions have been merged, in some embodiments, the local manager sends a notification to the global manager to indicate successful receipt, processing, and merging of the series of transactions.

In some embodiments, the local manager will have stored an earlier set of logical network configuration data for the particular datacenter (e.g., data from prior to losing and regaining connectivity with the global manager). The local manager maintains this earlier set of logical network configuration data while receiving and processing the series of transactions from the global manager, in some embodiments, in case of failover at the global manager (e.g., another loss of connection). After merging the received transactions, the local manager identifies entities from the earlier set of logical network configuration data that are not in the merged set of logical network configuration data but remain in a database of the local manager, and deletes these identified entities from the database. Following deletion of these entities, in some embodiments, the particular local manager proceeds to propagate the merged set of logical configuration data to physical network elements of the particular datacenter so that these physical network elements can implement the updated logical network correctly.

The global manager, in some embodiments, transfers the series of transactions to the particular local manager using an asynchronous channel. The asynchronous channel maintains a queue of the series of transactions during the transfer until all transactions, and the notification including the end marker, have been received by and processed at the particular datacenter according to some embodiments. In some embodiments, the global manager maintains, for each datacenter managed by the global manager, a respective asynchronous channel for communicating with a local manager of the datacenter.

The global manager includes, in some embodiments, multiple site managers, each of which manages a respective asynchronous channel and maintains connectivity data for the respective datacenter. According to some embodiments, the site managers maintain other information about their respective sites in addition to the connectivity data such as Internet Protocol (IP) address information. In some embodiments, the site manager of the particular datacenter detects, through the asynchronous channel, that the connection to the particular local manager has been restored after the period of unavailability. Based on this detection, the site manager requests that the identified portion of the logical network configuration to be transferred to the particular datacenter, thereby starting the transfer process described above. In some embodiments, in response to the request, a broker service of the global manager identifies the portion of the logical network configuration that is relevant to the particular datacenter, and provides (e.g., adds to the asynchronous channel's queue in a series of segments) the identified portion of the logical network configuration to the asynchronous channel according to some embodiments.

In some embodiments, a network administrator may want to add a new site (e.g., a datacenter) at which an existing logical network is implemented, thereby adding that datacenter (and at least some of the logical network elements) to the global logical network managed by the global manager. The administrator, in some embodiments, invokes an on-boarding process for the global manager of the existing logical network spanning multiple datacenters to add the new datacenter, and use the network manager of the datacenter as the local manager. The global manager requests, in some embodiments, the logical network configuration from the local manager, which transforms its local logical network configuration and provides the transformed logical network configuration to the global manager using an asynchronous channel. Transforming the logical network configuration in some embodiments includes changing the paths, and forwarding relationships, of policy objects of the logical network configuration to refer to global paths instead of paths of the local manger. The global manager receives the logical network configuration from the local manager through this asynchronous channel, processes the received logical network configuration, and stores the logical network configuration in its datastore, according to some embodiments.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, the Detailed Description, the Drawings, and the Claims is needed. Moreover, the claimed subject matters are not to be limited by the illustrative details in the Summary, the Detailed Description, and the Drawings.

DETAILED DESCRIPTION

Some embodiments provide a method for providing logical network configuration data from a global manager that manages a logical network spanning multiple datacenters to a local manager that manages the logical network at a particular one of the datacenters. Based on determining that the particular local manager requires a transfer of the full logical network configuration data for the particular datacenter (e.g., because connection to the particular local manager has been restored after a period of unavailability), the global manager identifies a portion of the logical network configuration that is relevant to the particular datacenter and transfers this portion to the particular local manager in a series of transactions. During the series of transactions (which may take place over a substantial period of time, depending on the amount of the logical network configuration data to be transferred), the global manager identifies any modifications to the identified portion of the logical network configuration, and includes these modifications as part of the series of transactions. Once the series of transactions is completed, the global manager transfers a notification to the particular local manager indicating completion of the series of transactions, so that the particular local manager is aware that the entire logical network configuration (including any changes made during that time period) has been transferred.

Some embodiments provide a system for implementing a logical network that spans multiple datacenters (e.g., in multiple different geographic regions). In some embodiments, one or more users (e.g., network administrators) define the logical network as a set of logical network elements (e.g., logical switches, logical routers, etc.) and policies (e.g., forwarding policies, firewall policies, etc.). The logical forwarding elements may be implemented across any number of the multiple datacenters such that data traffic is transmitted (i) between logical network endpoints within a single datacenter, (ii) between logical network endpoints in two different datacenters, and (iii) between logical network endpoints in a datacenter and endpoints external to the logical network (e.g., external to the datacenters).

Figure 1:
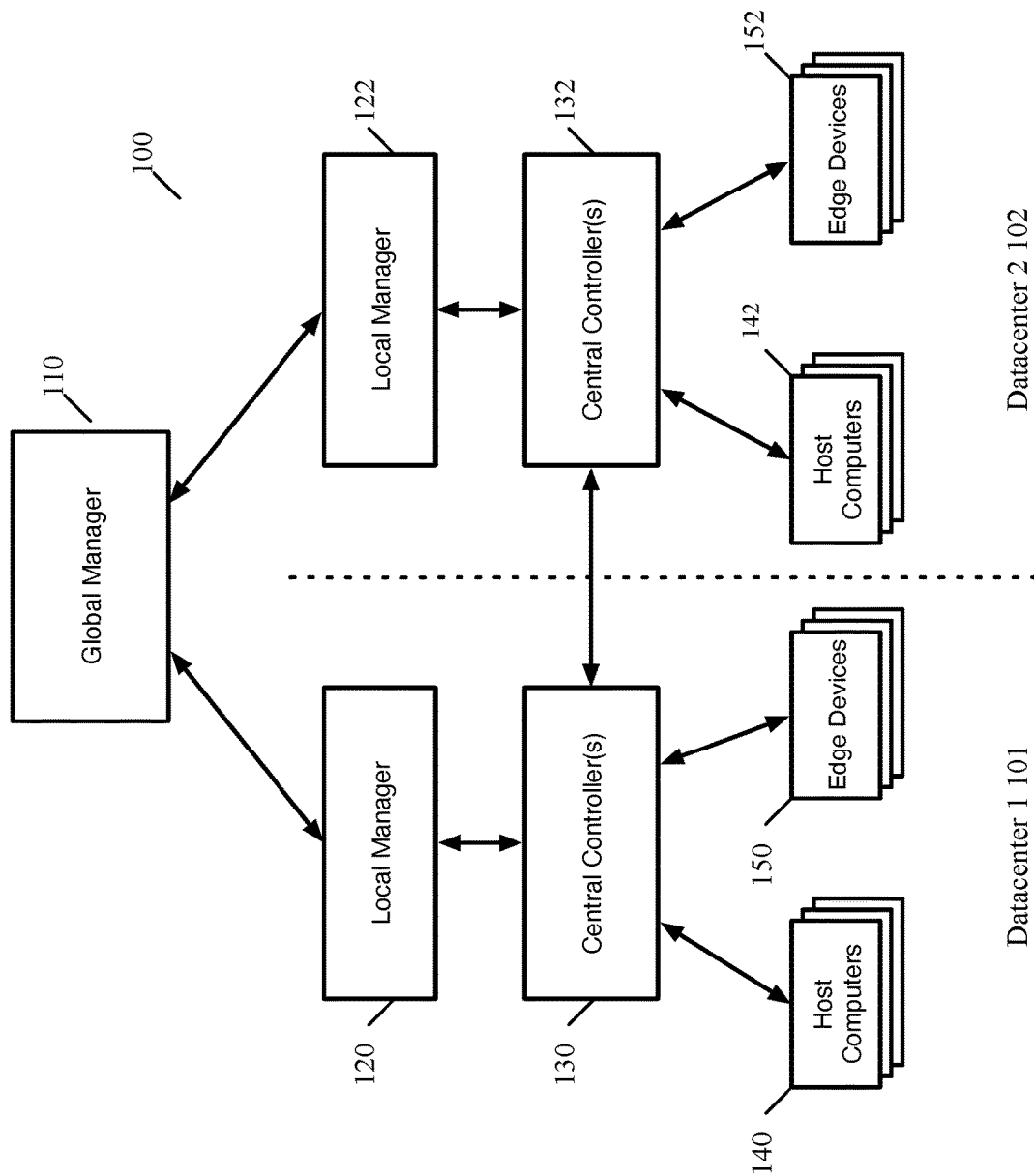
FIG. 1 conceptually illustrates an example embodiment of a logical network managed by a global manager.

The logical network, in some embodiments, is a conceptual network structure that one or more users (e.g., network administrators) define through a set of network managers. Specifically, some embodiments include a global manager as well as local managers for each datacenter in the logical network. FIG. 1 illustrates an example embodiment of such a network management system 100. As shown, the network management system 100 includes a global manager 110 as well as local managers 120 and 122 at each of two datacenters 101 and 102 spanned by the logical network. In addition to the local manager 120, the first datacenter 101 includes central controllers 130 as well as a set of host computers 140 and a set of edge devices 150. Similarly, the second datacenter 102 includes central controllers 132 as well as a set of host computers 142 and a set of edge devices 152 in addition to the local manager 122. While the network management system 100 for the logical network illustrates two datacenters spanned by the logical network, other embodiments can include any number of datacenters and sites spanned by the logical network (e.g., based on input by one or more network administrators through the global manager 110).

In some embodiments, the global manager executes on a computing device at one of the sites spanned by the logical network. This computing device, according to some embodiments, is the same device on which one of the local managers executes. Furthermore, in some embodiments, the global manager 110 is deployed as a set of machines.

Some embodiments employ a primary global manager and a secondary global manager (not shown here), in an active-standby arrangement. The primary global manager is asynchronously synchronized with the secondary global manager as a standby for failover scenarios, according to some embodiments. The secondary global manager executes on a different computing device than the primary global manager and, for resiliency, is located in some embodiments at a different site than the site where the primary global manager executes, and further maintains a respective database that is independent from the database of the primary global manager. Like the primary global manager, the secondary global manager is also deployed, in some embodiments, as a set of machines, and may execute on the same computing device as a different local manager.

As shown, each of the datacenters of the network management system 100 includes a local manager 120-122 to connect each of the datacenters 101-102 to the global manager 110. Each local manager, in some embodiments, executes on a computing device at its datacenter and is responsible for managing its datacenter. In some embodiments, as noted above, the global manager executes on the same computing device at a physical site (e.g., datacenter) as the local manager managing that physical site. The global manager and the local managers, in some embodiments, are separate modules of a single application. Like with the global manager as discussed above, some embodiments deploy each local manager at a physical site as a cluster of machines, with each machine executing on a different computing device at the same site.

The local managers 120-122, in some embodiments, use a logical network configuration, received from the global manager, to manage the logical network at their respective datacenters. For example, in some embodiments, the local managers 120-122 use the received logical network configurations to generate and provide configuration data to the one or more central controllers 130-132 of the logical network (e.g., a cluster of controllers at each site). In some embodiments, these central controllers identify computing devices, such as the sets of host computers 140-142, at the site which executes physical forwarding elements, such as the sets of edge devices 150-152, and distribute the configuration data to the identified computing devices.

In addition to the logical network configuration from the global manager, each local manager, in some embodiments, receives input from a user (e.g., network administrator) for configuring their respective datacenter. In some embodiments, user input overrides parts of the logical network configuration from the global manager. For instance, a user may specify that a particular network element in the logical network configuration should remain as part of a particular datacenter's configuration, regardless of whether an update to the logical network configuration from the global manager includes instructions to delete the particular network element. Additional information regarding an override in some such embodiments will be discussed further below with reference to FIG. 8.

Some embodiments have local controllers (also referred to as chassis controllers) that execute on one or more of the computing devices, and which receive the configuration data from the controller cluster. The local controllers use the configuration data, in some embodiments, to configure the physical forwarding elements to implement the logical network elements. Each site's controller cluster also creates mappings between logical addresses (e.g., MAC addresses of logical network endpoints such as end machines executing on the computing devices) and physical addresses (e.g., IP addresses of tunnel endpoints at the computing devices), and distributes these mappings to each computing device, as well as to other controller clusters at other sites in the federation, according to some embodiments.

Figure 2:
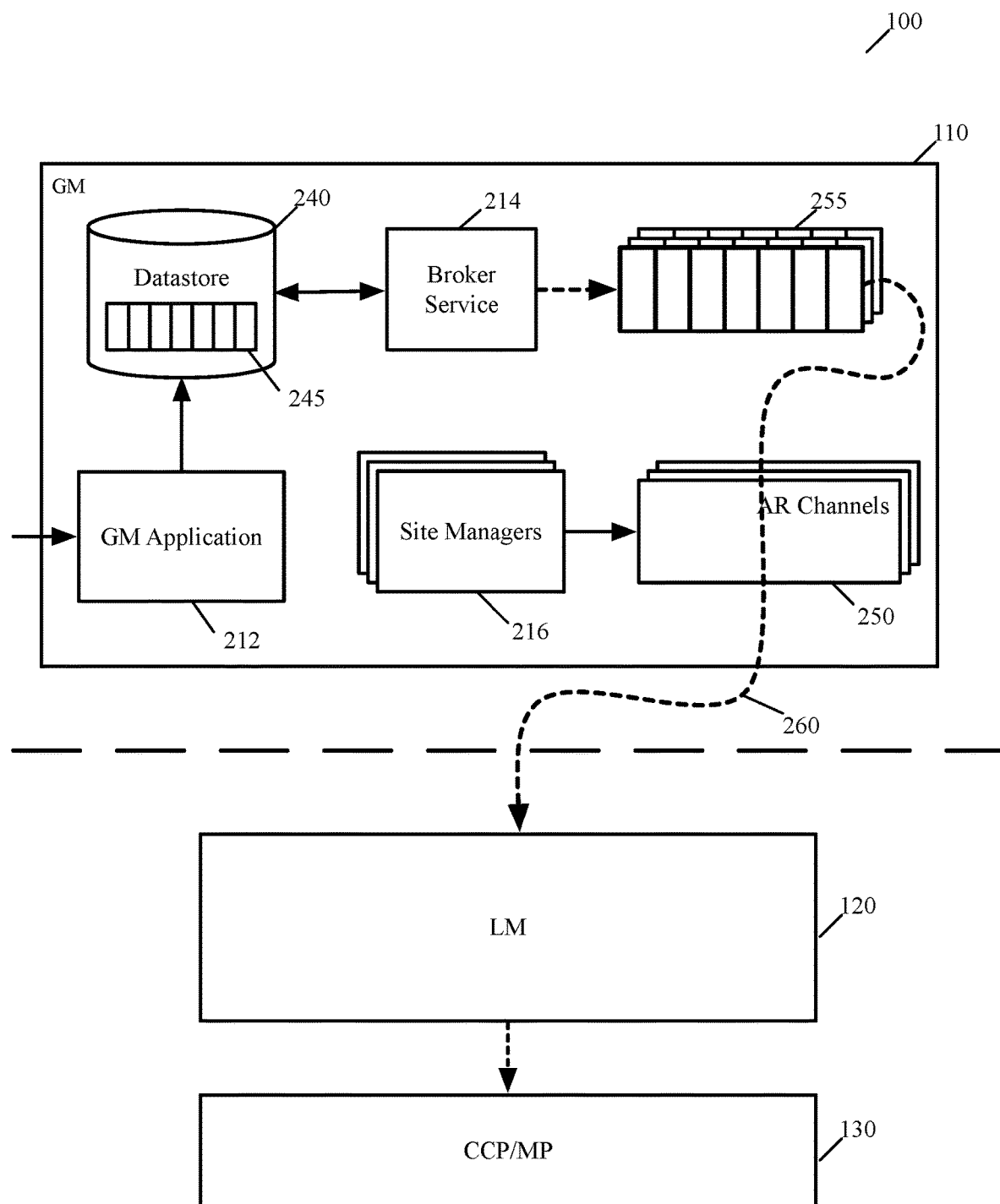
FIG. 2 conceptually illustrates an in-depth view of a global manager, according to some embodiments.

FIG. 2 illustrates an in-depth view of the global manager 110 of the network management system 100 according to some embodiments. The network management system 100 additionally includes the local manager 120 and central control plane/management plane 130. As shown, the global manager 110 includes a global manager application 212, a datastore 240, a broker service 214, a set of site managers 216, a set of asynchronous queues 255 (also referred to as AR (asynchronous replicator) queues 255), and a set of asynchronous channels 250 (also referred to as AR channels 250).

The global manager application 212, in some embodiments, is the core application of the global manager 110, and is responsible for receiving data that is input by a user (e.g., a network administrator) and writing the received data to the datastore 240. For example, in some embodiments, the global manager application 212 receives an update to the logical network configuration (e.g., from a user/network administrator) and writes the received update to the datastore 240 where the logical network configuration is stored and maintained. In writing the update to the datastore 240, the global manager application 212 in some embodiments also adds the received update to a persistent queue 245 of the datastore 240 in order for the update to subsequently be provided to any datacenters managed by the global manager for which the update is relevant.

The datastore 240, in some embodiments, is the main database for the global manager and houses the logical network configuration. In some embodiments, the persistent queue 245 in the datastore 240 is a set of persistent queues, each of which is exclusively reserved for a local manager (e.g., local managers 120-122) at each datacenter, such that when the global manager application 212 receives the logical network configuration, the global manager application stores portions of the logical network configuration in each of the queues, based on the relevance of the portions to the configuration of the logical network at the queue's corresponding datacenter.

In some embodiments, the broker service 214 is responsible for identifying relevant portions of the logical network configuration for each datacenter. To do so, in some embodiments, the broker service first calculates a span of the logical network elements to determine which logical network elements are implemented at each datacenter. In some embodiments, the span calculation is based on the relationships between the nodes in a global policy tree. The global policy tree and span calculation will be discussed further below with reference to FIGS. 3-4.

The asynchronous channels 250 of the global manager 110 are each for maintaining a connection with a local manager of a datacenter managed by the global manager, according to some embodiments. In other words, each asynchronous channel 250 in some embodiments connects the global manager 110 to a corresponding local manager. The global manager 110 further maintains the set of asynchronous queues 255 to which data intended for each datacenter is added, and subsequently transmitted, via the datacenter's corresponding asynchronous channel in the set of asynchronous channels 250, to the local manager of the datacenter, as illustrated by the transmission path 260. It should be noted that while the asynchronous queues 255 are depicted outside of the datastore 240, in some embodiments, these asynchronous queues are within the datastore 240.

The site managers 216 of the global manager 110 each manage an asynchronous channel and maintain connectivity data for the datacenter corresponding to the asynchronous channel. According to some embodiments, the site managers 216 maintain other information regarding their respective sites in addition to the connectivity data, such as Internet protocol (IP) address information. While the site managers 216 are illustrated as separate from the asynchronous channels 250, in some embodiments, the site managers 216 may be housed within the asynchronous channels 250. The structure of the global manager is described in further detail in the concurrently filed U.S. patent application Ser. No. 16/906,960, which is incorporated herein by reference.

Figure 3:
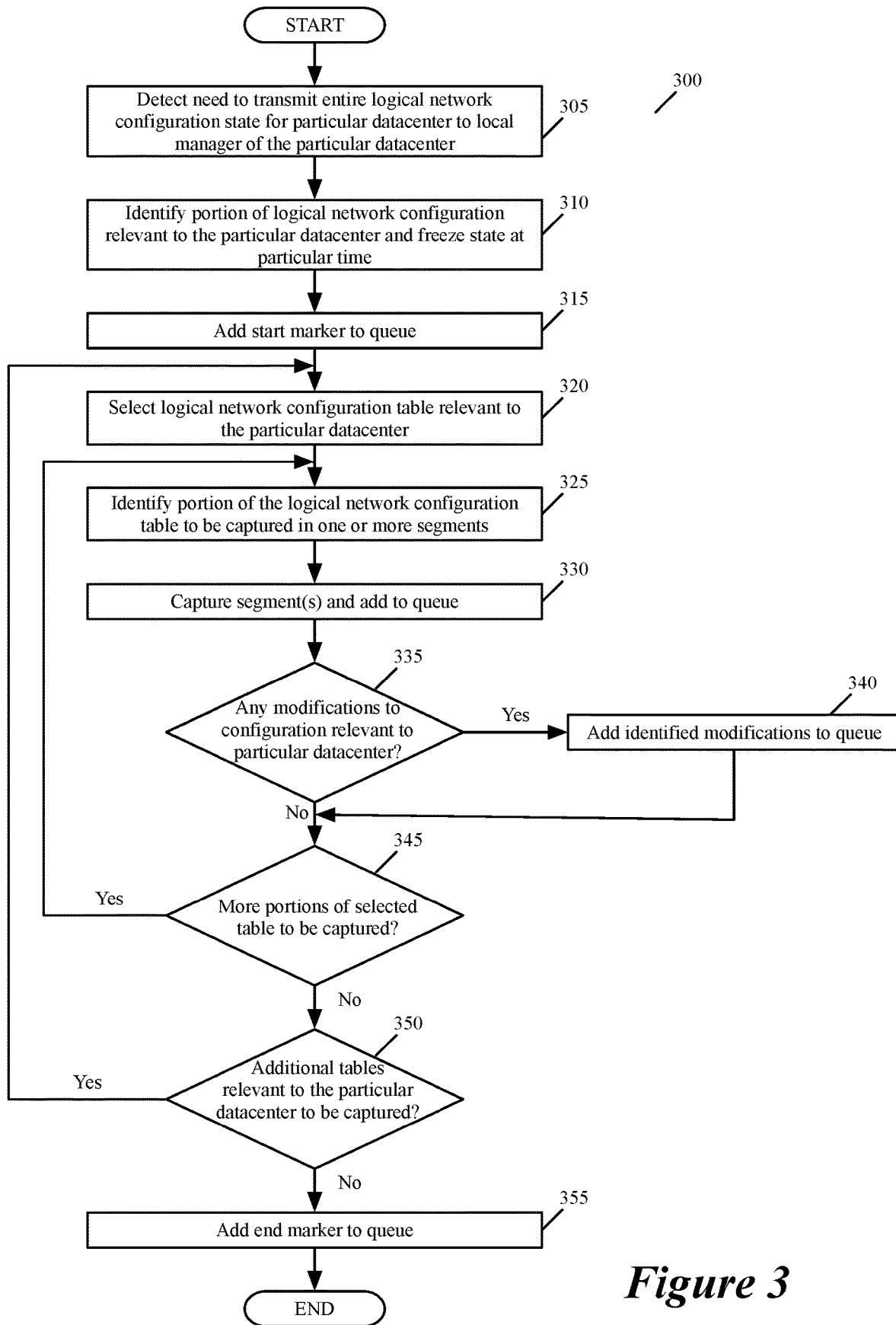
FIG. 3 illustrates a process for a global manager to provide logical network configuration data to a local manager of a datacenter, according to some embodiments.

FIG. 3 illustrates a process 300 for providing logical network configuration data from a global manager (e.g., global manager 110) that manages a logical network spanning multiple datacenters to a local manager (e.g., local manager 120) that manages the logical network at a particular datacenter. The process starts, at 305, by detecting the need to transmit the entire logical network configuration state for a particular datacenter to the local manager of that datacenter.

A site manager for the particular datacenter (e.g., one of the site managers 216), in some embodiments, is responsible for detecting the need to transmit the entire logical network configuration state for the particular datacenter. In some embodiments, the site manager for the particular datacenter detects this need via the asynchronous channel with the particular datacenter. For example, in some embodiments, the site manager may detect that a connection to a particular local manager of a particular datacenter has been restored after a period of downtime (e.g., two days). In other embodiments, onboarding of a new datacenter, or unsuccessful transmissions due to slow processing of the logical network configuration by a particular local manager that causes its asynchronous queue to become overrun, may result in the need to transmit the entire logical network configuration to a particular datacenter.

After detecting the need to transmit the entire logical network configuration state for the particular datacenter, the process identifies, at 310, a portion of the logical network configuration that is relevant to the particular datacenter, and freezes a state of the identified portion of the logical network configuration at a particular time in order to capture a consistent state of the entire identified portion of the logical network configuration during the remaining steps of the process 300. As noted above, step 310 is performed by the broker service of the global manager (e.g., broker service 214 of the global manager 110) by computing a span for network elements of the logical network configuration to identify any network elements that include the particular datacenter in their span, according to some embodiments. This span calculation, in some embodiments, is based on the relationships between the network elements of the logical network.

In some embodiments, the global configuration of the logical network is expressed as a hierarchical tree (also referred to as a global policy tree) with nodes and connections between the nodes. The nodes, in some embodiments, represent logical network elements that span one or more sites (e.g., datacenters), and logical network policies that apply to those network elements, while the connections between the nodes represent relationships between the network elements represented by the nodes. The span calculation is then computed based on the connections between the nodes, in some embodiments. For example, a parent-child relationship between two nodes would result in the child node inheriting its span from the parent node, according to some embodiments. As another example, in some embodiments, a relationship between two nodes where there is a dependence of one node on another node, the relationship may be expressed as a reference from one node to the other, and the span of the dependent node will depend on the referenced node. Some logical network elements also have a pre-defined span in some embodiments, e.g. defined by an administrator of the network. Additional information regarding span and span calculation can be found in the concurrently filed U.S. patent application Ser. No. 16/906,960, which is incorporated by reference above.

Figure 4:
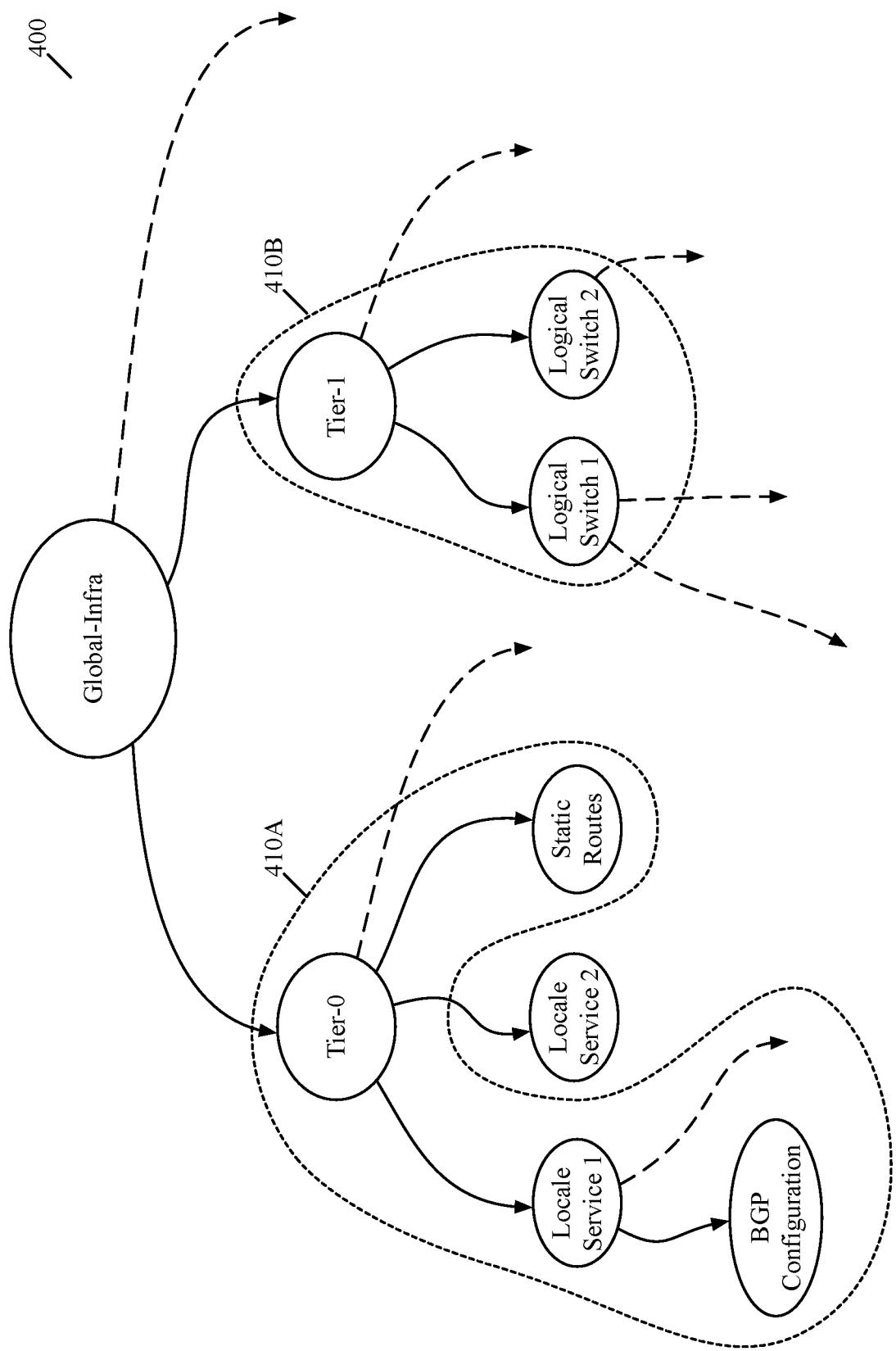
FIG. 4 conceptually illustrates a selection of a portion of the logical network configuration from a global policy tree, according to some embodiments.

FIG. 4 illustrates an example of a portion of a global policy tree 400. The logical network elements represented in a global policy tree, such as the global policy tree 400, in some embodiments, include logical forwarding elements that forward data in the logical network, such as the logical switches. These logical network elements also include logical constructs in some embodiments, such as logical ports associated with the logical forwarding elements, domains that are logical groupings of one or more sites (e.g., geographic regions), and groups of logical network endpoints that share one or more attributes (e.g., operating system, region, etc.).

Each logical network element, in some embodiments, is implemented by physical forwarding elements executing on computing devices at the sites (e.g., datacenters) in the logical network that are spanned by that logical network element. The broker service 214 calculates a span for each of the logical network elements in the global policy tree 400 to identify portions of the global policy tree that are relevant to the particular datacenter (i.e., include elements that span the particular datacenter). As shown, the global policy tree 400, includes such identified portions 410A-410B. Thus, the elements included within the portions 410A-410B would be included in the portion of the logical network configuration identified for the particular datacenter. Additional information regarding global policy trees can also be found in the concurrently filed U.S. patent application Ser. No. 16/906, 960, which is incorporated by reference above.

Returning to process 300 of FIG. 3, after the relevant portion of the logical network configuration has been identified and frozen at the particular time, the process moves to 315 to add a start marker to the asynchronous queue for the particular datacenter. Like step 310, step 315 is also performed by the broker service 214, which adds the start marker to one of the asynchronous queue 255 that corresponds to the particular datacenter, to mark the start of a series of transactions of the identified portion of the logical network configuration to the particular local manager of the particular datacenter. In addition to marking the start of the series of transactions, in some embodiments, the start marker indicates the start of the period of time during which modifications to the logical network configuration state are to be identified. In other words, in some embodiments, the start marker is indicative of the particular time at which the state of the logical network configuration has been frozen for capture.

Next, the process selects, at 320, a logical network configuration table that is relevant to the particular datacenter (e.g., a table included in the identified portion of the logical network configuration found to be relevant to the particular datacenter). A logical network configuration table may include any one of a logical router table, a logical switch table, a security group table, a policy rule table, etc., according to some embodiments. After a logical network configuration table has been selected, the process continues on to step 325 to identify a portion of the selected logical network configuration table to be captured in one or more segments.

Figure 5:
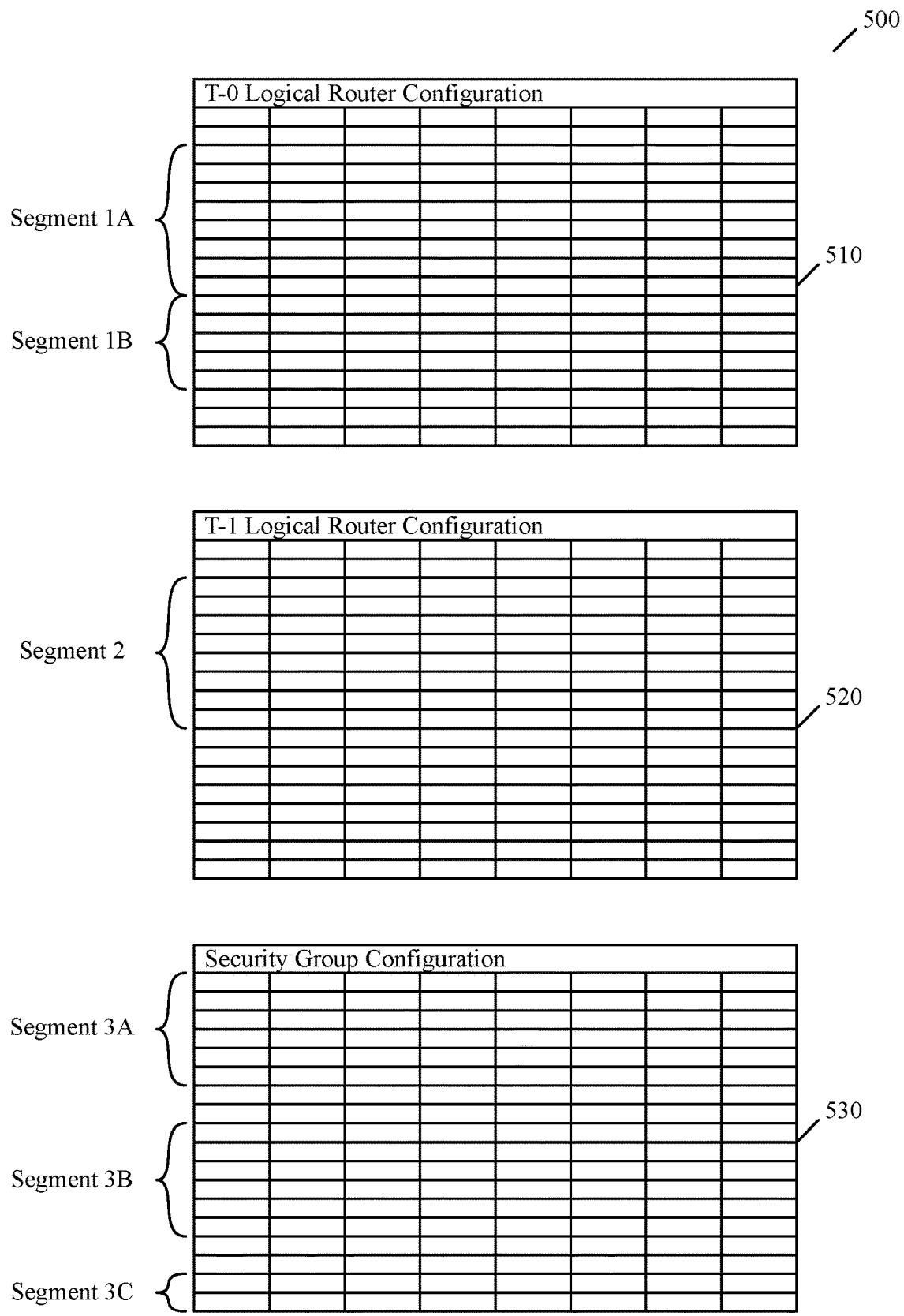
FIG. 5 conceptually illustrates a set of logical network tables selected from the logical network configuration to be provided to a datacenter, according to some embodiments.

FIG. 5 illustrates a set of logical network configuration tables 500 found to be relevant for a particular datacenter. The set of logical network configuration tables 500 include a Tier-0 logical router configuration table 510, a Tier-1 logical router configuration table 520, and a security group configuration table 530. Other embodiments may include different tables than those depicted, as well as fewer or additional tables than those depicted. As shown, each of the tables 500 includes one or more segments to be captured based on their identified relevancy to the particular datacenter.

After identifying the portions of the selected logical network configuration table to be captured, the process 300 moves to step 330 to capture the identified portion(s) of the selected table in one or more segments, and add the captured segments to the queue. For example, table 510 includes the identified segments 1A and 1B. In some embodiments, the broker service (e.g., broker service 214) captures these segments from the selected table within the datastore (e.g., datastore 240) and adds the captured segments to the queue (e.g., one of the asynchronous queues 255). Additionally, while segments 1A and 1B are consecutive within the table 510, they are captured separately, and added to the queue as two consecutive segments according to some embodiments. In some embodiments, this segmentation is due to transaction size limits.

Next, at 335, the process determines whether any modifications to the relevant portions of the logical network configuration have been made (e.g., since the start time indicated by the start marker). In some embodiments, identification of modifications to the relevant portions of the logical network configuration is performed simultaneously with capturing segments of the logical network configuration (i.e., in real-time or near real-time). Identifying these modifications ensures that the logical network configuration provided to the particular datacenter is both complete and up-to-date, according to some embodiments, and additionally ensures that the particular datacenter is synchronized with the other datacenters that are a part of the global logical network configuration.

If the process 300 determines that no modifications have been made to any relevant portions of the logical network configuration, the process transitions to 345. Otherwise, if the process 300 determines that modifications have been made to relevant portions of the logical network configuration, the process 300 transitions to step 340 to add the identified modifications to the queue. In some embodiments, the identified modifications are represented as a change log listing changes/modifications to the logical network configuration tables (i.e., as opposed to a captured state of the logical network configuration).

Once the identified modifications have been added to the queue, the process proceeds to operation 345 to determine whether additional portions of the selected logical network configuration table are to be captured. For example, while table 510 of the set of tables 500 includes two segments 1A and 1B of a same portion as mentioned above, and table 520 includes a single segment 2, table 530 includes a set of three separate segments 3A-3C representing three portions of the table to be captured. If the process determines at 345 that more portions of the selected table are to be captured, the process transitions to back to step 325 to identify the portion of the selected table to be captured.

Otherwise, if the process determines at 345 that no additional portions of the selected table are to be captured, the process transitions to step 350 to determine if there are additional tables relevant to the particular datacenter to be captured. If the process determines at 350 that there are additional tables to be captured, the process returns to step 320 to select a logical network configuration table relevant to the particular datacenter to capture. Otherwise, if the process determines at 350 that no additional tables are to be captured, the process transitions to 355. At 355, the process adds an end marker to the queue to indicate an end time of the series of transactions. After the addition of the end marker, the process 300 ends.

Figure 6:
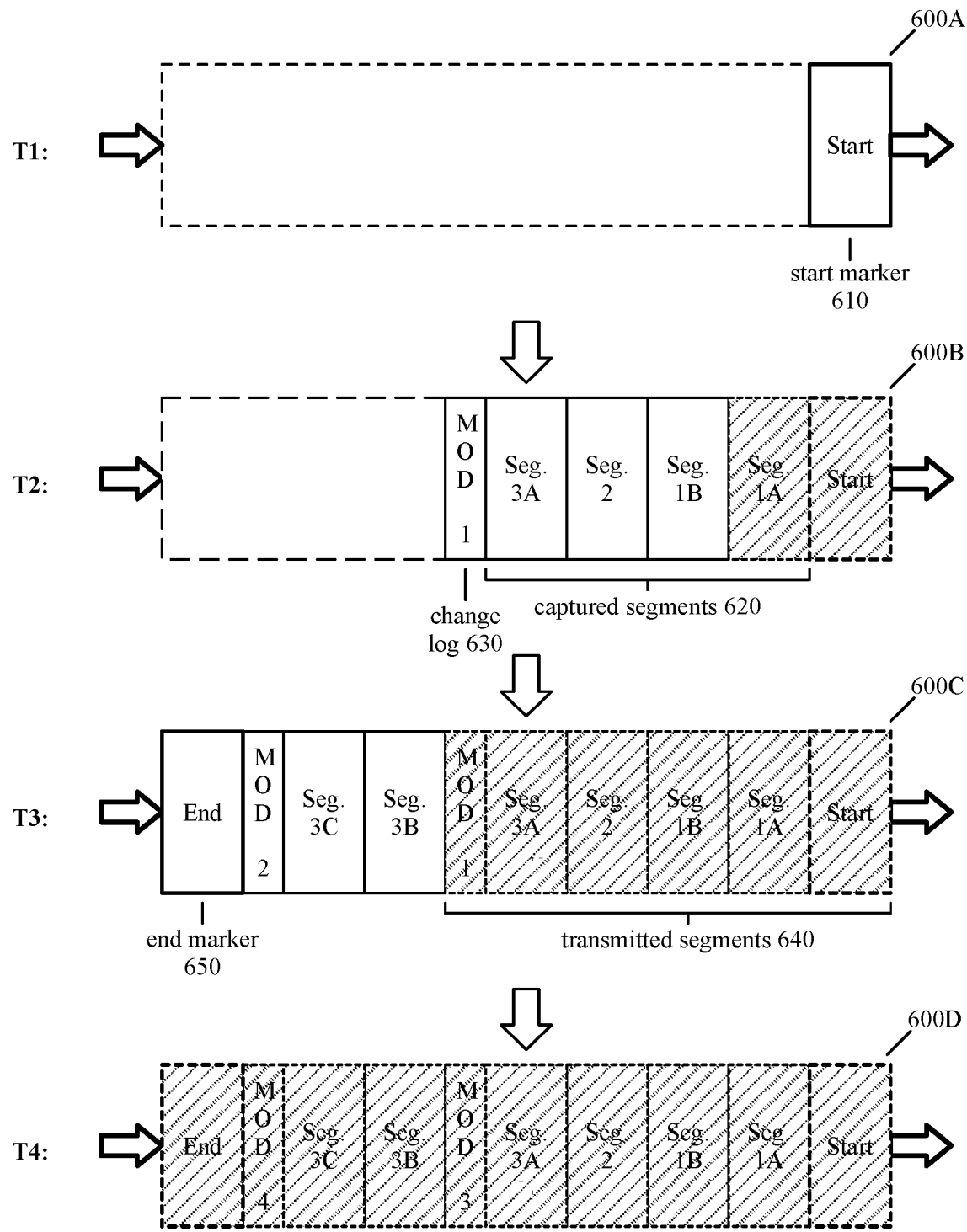
FIG. 6 conceptually illustrates an asynchronous queue as it is populated over a period of time, according to some embodiments.

FIG. 6 conceptually illustrates an example embodiment of an asynchronous queue over four states 600A-D as it is populated over a period of time T1-T4 with multiple captured segments and identified modifications. As shown, at time T1, a start marker 610 is added to the first state of the queue 600A (e.g., as described in step 315 of the process 300 above), while the remainder of the queue has yet to be populated. As described above, the start marker in some embodiments represents a particular time at which a state of the logical network configuration is frozen for capture. In some embodiments, the particular time may be expressed as a logical time rather than a physical time such that as physical time passes, each table, and segment of the table therein, that is captured is captured at the same logical time, regardless of physical time.

At time T2, the second state of the asynchronous queue 600B includes a series of captured segments 620 (i.e., segments 1A, 1B, 2, and 3A) representing segments of tables (e.g., the tables 500 of FIG. 5) that have been captured and added to the asynchronous queue since the time indicated by the start marker 610. The second state of the asynchronous queue 600B also includes a change log 630, which as described above represents identified modifications to relevant portions of the logical network configuration (e.g., modifications identified and added at steps 335-340 of process 300).

At time T3, the third state of the asynchronous queue 600C includes additional segments 3B and 3C, as well as a second change log, and an end marker 650. The end marker 650 indicates an end of the series of transactions as well as an end to the time period during which modifications are identified, according to some embodiments and as described above with reference, e.g., to FIG. 3. As shown, the third state of the asynchronous queue 600C further includes a set of transmitted segments 640 (e.g., from the start marker through the first change log), represented with a different appearance (e.g., a dotted outline and crosshatching) to indicate that they have been transmitted. The second state of the asynchronous queue 600B also includes a set of transmitted segments including the start marker and segment 1A, as shown. Thus, between time T2 and time T3, segments 1B, 2, and 3A, as well as the first change log, are transmitted.

Lastly, at time T4, the fourth state of the asynchronous queue 600D includes all of the same segments and modifications as depicted in the third state of the asynchronous queue 600C, but now, the remaining segments (e.g., segments 3B and 3C, the second change log, and the end marker) have also been transmitted, as represented by the change in their appearance (e.g., now depicted with the dotted outline and crosshatching). While the example asynchronous queue 600A-D includes a small sample of segments and modifications, other embodiments may include significantly more (i.e., hundreds) of segments and modifications that are captured, added to the queue, and transmitted for a particular datacenter.

Figure 7:
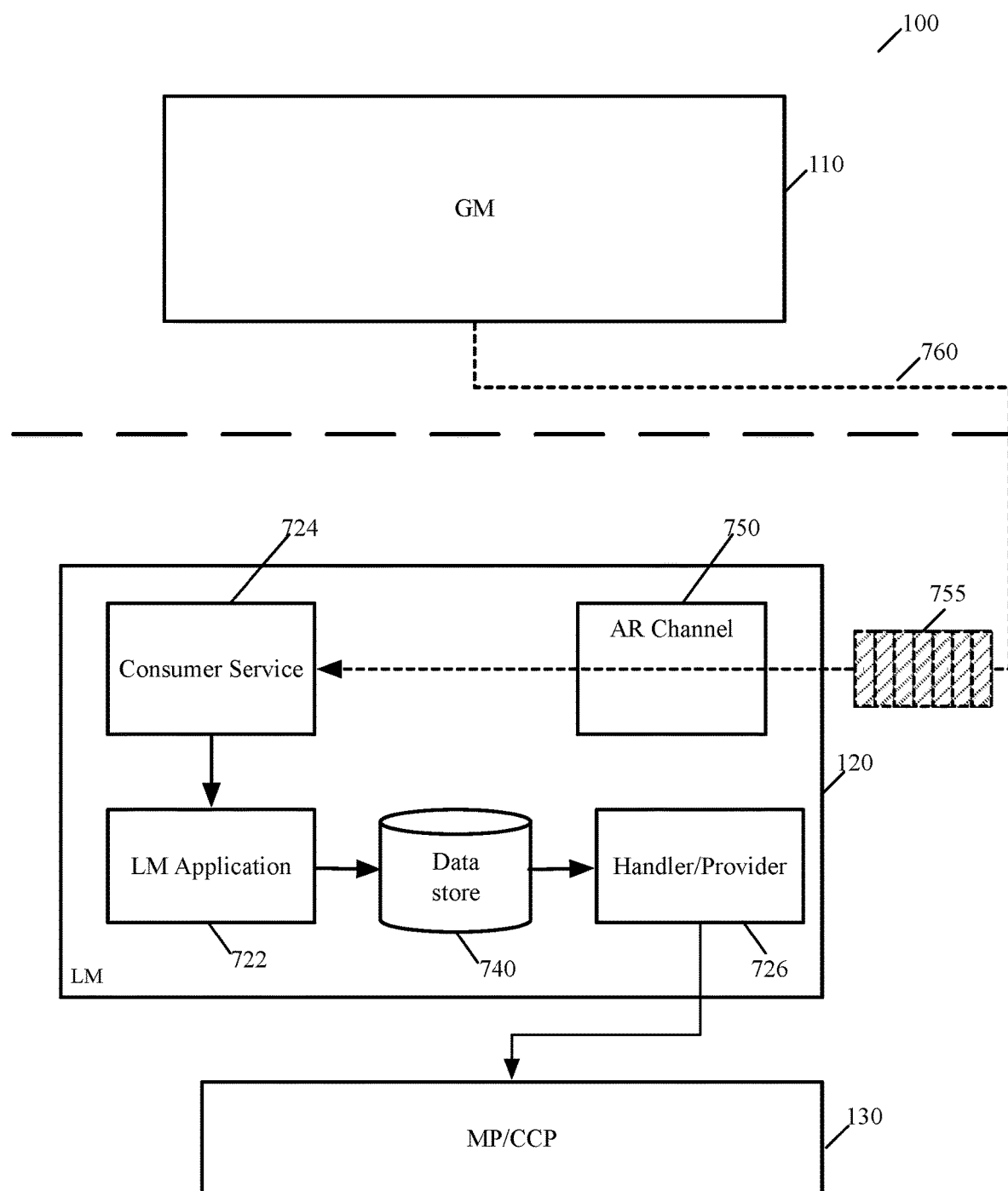
FIG. 7 conceptually illustrates an in-depth view of a local manager of a datacenter, according to some embodiments.

FIG. 7 illustrates an in-depth view of the local manager 120 of the network management system 100, according to some embodiments. In addition to the local manager 120, the network management system 100 also includes the global manager 110 and the central control plane/management plane 130 (e.g., as described above for FIGS. 1-2). As shown, the local manager 120 includes a local manager application 722, a consumer service 724, a handler/provider 726, a datastore 740, and an asynchronous channel 750 (also referred to as AR channel 750).

In some embodiments, as the global manager 110 transmits the series of transactions (e.g., transactions 755) via the path 760 to the local manager 120, the asynchronous channel 750 notifies the consumer service 724 regarding the incoming transactions. The consumer service 724 then processes the incoming series of transactions 755 and merges the processed transactions into a set of logical network configuration data, in some embodiments. After merging the transactions, the consumer service 724 provides the transactions 755 to the local manager application 722 to be validated and persisted into the datastore 740. The handler/provider 726, in some embodiments, retrieves the set of logical network configuration data from the datastore 740 and provides the set of logical network configuration data to the central control plane/management plane 130 for realization and for updating the local network elements.

Figure 8:
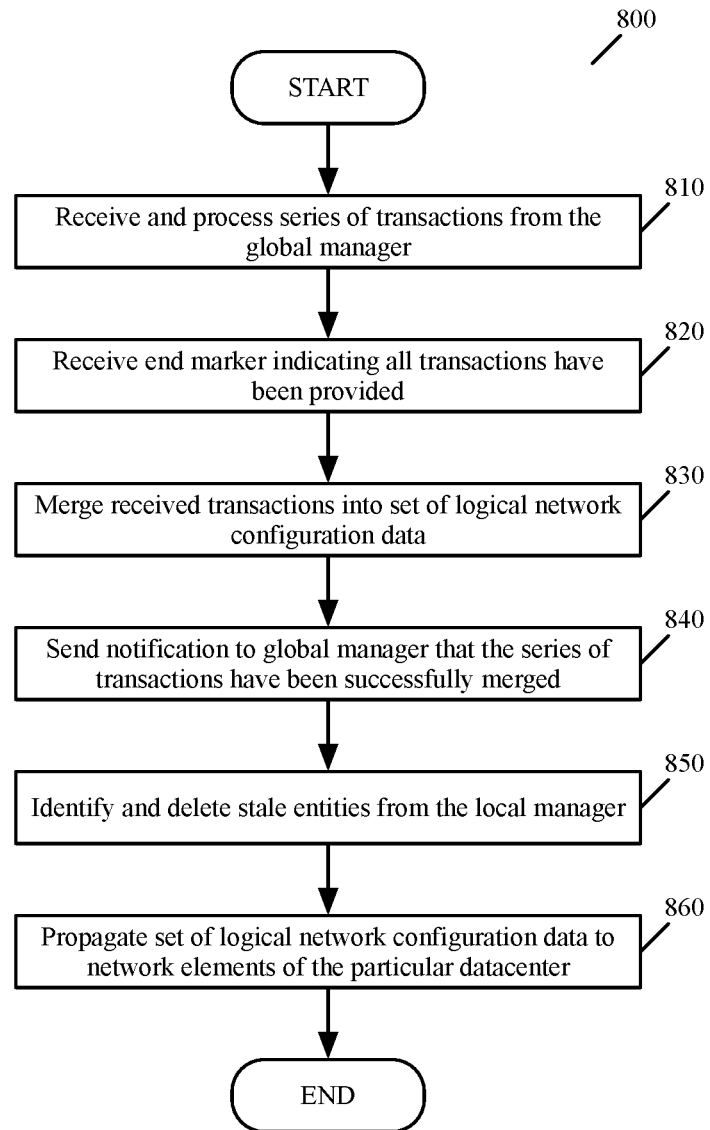
FIG. 8 illustrates a process for a local manager to receive logical network configuration in a series of transactions from the global manager, according to some embodiments.

FIG. 8 illustrates a process 800 for a local manager (e.g., local manager 120) as it receives a series of transactions from a global manager (e.g., global manager 110), according to some embodiments. Process 800 begins at 810 by receiving and processing a series of transactions from the global manager. As noted above with reference to FIG. 7, in some embodiments, following notification by the asynchronous channel 750 of the incoming transactions, the consumer service of the local manager is responsible for receiving and processing the series of transactions.

In some embodiments, the series of transactions (as described above with references to FIGS. 2-7) includes captured segments of a portion of the logical network configuration identified as relevant to the particular datacenter managed locally by the local manager. The series of transactions additionally includes a start marker (e.g., start marker 610 illustrated FIG. 6) and change logs that indicate modifications to the relevant portion of the logical network configuration identified during the period of time that the segments of the logical network configuration were captured, according to some embodiments.

Next, at step 820, the process 800 receives an end marker (e.g., end marker 650 illustrated in FIG. 6) indicating all transactions have been provided. Following receipt of the end marker, the process 800 moves to step 830 to merge the received series of transactions into a set of logical network configuration data. Step 830, in some embodiments, is also performed by the consumer service of the local manager as described above.

After the received transactions have been merged at 830, the process 800 sends a notification at 840 to the global manager indicating that the series of transactions has been successfully received, processed, and merged. The consumer service of the local manager is responsible for sending notifications to the global manager, according to some embodiments. Sending notifications to the global manager, in some embodiments, includes updating a state of the transfer process. For example, in some embodiments, the consumer service updates a state of the transfer process to "COMPLETED" to indicate that the transactions have been successfully received, processed, and merged.

In some embodiments, as described above, the consumer service provides the set of logical network configuration data to the local manager application (e.g., local manager application 722) of the local manager for validation after updating the state of the transfer process. In some embodiments, the local manager application performs validations on the set of logical network configuration data in order to avoid misconfigurations. Once the local manager application validates the set of logical network configuration data, the local manager application stores the set of data in the datastore of the local manager (e.g., writes the data to the datastore 740).

Next, at 850, the process identifies and deletes stale entities. In some embodiments (e.g., for existing datacenters), the local manager will have an earlier set of logical network configuration data for the datacenter (i.e., residual configuration data) stored in the datastore of the local manager (e.g., datastore 740). Accordingly, in some such embodiments, the local manager has to identify any entities from the earlier set of logical network configuration data that do not exist in the newly merged set of logical network configuration data but remain in a database of the local manager (e.g., datastore 740), and deleted these stale entities. In some embodiments, the handler/provider (e.g., handler/provider 726) of the local manager is responsible for the identification and deletion of stale entities.

In some embodiments, the local manager includes an override for a particular network element that has been identified as a stale entity that should be deleted. In some such embodiments, the local manager creates a shadow copy of the global policy tree (e.g., global policy tree 400) that still includes the particular network element in order to maintain the particular network element locally without affecting the global logical network configuration. A user (e.g., network administrator) of the local manager, in some embodiments, can use and modify the shadow copy of the particular network element from the shadow copy of the global policy tree. The global manager, according to some embodiments, does not maintain a shadow copy of the global policy tree that includes network elements that have been deleted from the global configuration, but have kept by any of the datacenters. However, in some embodiments, the local managers may notify the global manager of any network elements that have been kept following deletion at the global manager.

Lastly, following the identification and deletion of stale entities at 850, the local manager propagates, at 860, the set of logical network configuration data to network elements of the particular datacenter. In some embodiments, as described above, the handler/provider retrieves the set of logical network configuration data from the datastore (i.e., after the local manager application writes the set of data to the datastore) and propagates the set of data to the central control plane/management plane (e.g., central control plane/management plane 130) for realization. The process 800 then ends.

The consumer service of the local manager, in some embodiments, updates a state of the transfer process following each step in the process 800. This allows the global manager to track the transfer process from start to finish, according to some embodiments. For example, following the deletion of stale entities by the handler/provider, the consumer service, in some embodiments, updates the state of the transfer process to "DELETED_STALE_ENTITIES". In another example, if the consumer service fails to receive any part of the series of transactions, the consumer service can update the state of the transfer process as "ERROR", according to some embodiments. In some such embodiments, the global manager may repeat the transfer process to ensure that the particular datacenter receives all necessary parts of the logical network configuration.

Figure 9:
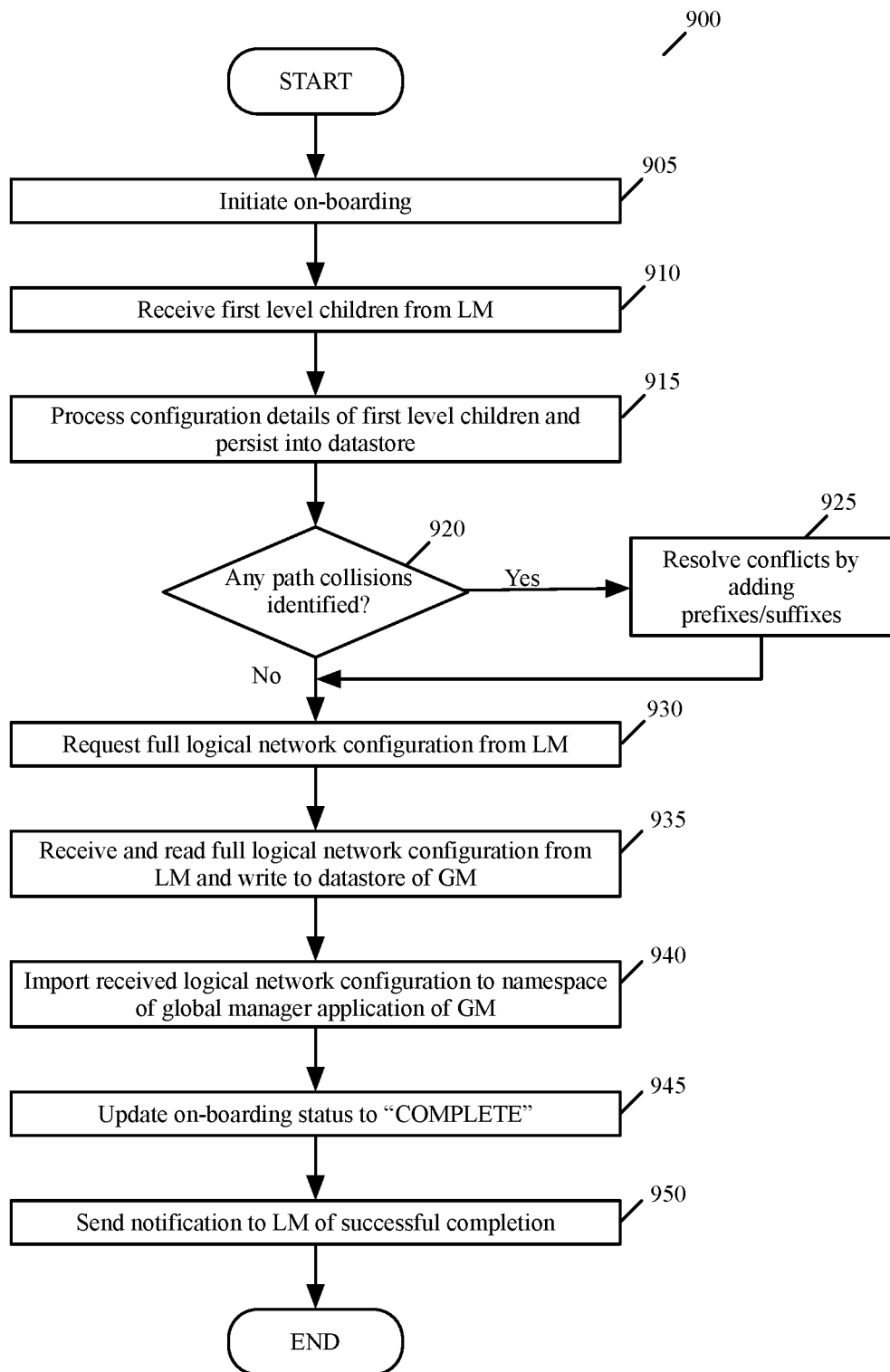
FIG. 9 conceptually illustrates a process of some embodiments for on-boarding a new datacenter at which a local manager currently manages a logical network.

In some embodiments, a network administrator may want to add a new site (e.g., a datacenter) at which an existing logical network is implemented, thereby adding that datacenter (and at least some of the logical network elements) to the global logical network managed by the global manager. The administrator, in some embodiments, invokes an on-boarding process for the global manager of the existing logical network spanning multiple datacenters to add the new datacenter, and use the network manager of the datacenter as the local manager. FIG. 9 conceptually illustrates a process 900 of some embodiments for on-boarding a new datacenter at which a local manager currently manages a logical network. In some embodiments, the process 900 is performed by a global manager (e.g., by a global on-boarding coordinator of the global manager).

The process 900 starts, at 905, by initiating the on-boarding process. The global on-boarding coordinator, in some embodiments, initiates the on-boarding process based on administrator input specifying the site to be on-boarded and verifying connection and authentication information with the local manager for the site to be onboarded. In some embodiments, the global on-boarding coordinator requests, from the local manager, first level children (e.g., logical routers, domains, etc.) from a policy tree maintained by the local manager (e.g., a local version of the global policy tree 400 described above). Accordingly, at 910, the global on-boarding coordinator receives the first level children from the local manager. In some embodiments, when the global manager receives the first level children from the local manager, the global manager updates the status of the on-boarding process to "IN PROGRESS". The user, in some embodiments, can request the current status of the on-boarding process from the global manager (e.g., through a client application that accesses the global manager).

At 915, the global on-boarding coordinator processes the configuration details of the received first level children, and persists the configuration into the datastore of the global manager (e.g., the datastore 218 of the global manager 110). In some embodiments, processing and persisting the configuration details includes checking for unsupported features. The unsupported features, in some embodiments, include identity groups (active directory groups for identity firewall) and virtual private networks (VPNs). When one or more unsupported features are detected, in some embodiments, the global on-boarding coordinator alerts the user of the unsupported features to try to rework the features.

Next, the global on-boarding coordinator determines, at 920, whether there are any conflicts in the first-level children. For example, if the local manager has a specific type of router with a particular name in its policy tree, and the global manager also has the same type of router with the same particular name in its own policy tree, there will be a conflict. Some embodiments provide the user with information regarding these conflicts. When there are no conflicts identified at 920, the process transitions to 930.

Otherwise, when the global on-boarding coordinator identifies one or more conflicts at 920, the process transitions to 925 to resolve the conflicts. Some embodiments allow the user to manually change the identifiers/name for the conflicting construct, or have the global manager automatically modify the name using prefixes/suffixes (e.g., a site name). For example, the global on-boarding coordinator adds a prefix or a suffix to entities in order to make them unique from the entities already existing on the global manager, according to some embodiments. The process then transitions to 930.

At 930, the process requests, from the local manager, the full logical network configuration. In some embodiments, as described above, the logical network configuration is represented by a policy tree. However, unlike when the global manager transfers a portion of the logical network configuration to a local manager, the local manager provides the entire logical network configuration to the global manager. As will be described below with reference to FIG. 10, in some embodiments, the local manager performs transformations on the network elements in the logical network configuration prior to transmitting the logical network configuration to the global manager.

Next, the global on-boarding coordinator receives and reads, at 935, the full logical network configuration from the local manager, and invokes services to write the logical network configuration to the datastore of the global manager. The global manager, in some embodiments, receives the full logical network configuration data through an asynchronous channel (e.g., one of the AR channels 250) opened between the global manager and the local manager. In some embodiments, the asynchronous channel notifies the global on-boarding coordinator of the incoming logical network configuration from the local manager.

At 940, the global on-boarding coordinator imports the received logical network configuration to a global namespace of the global manager application on the global manager (e.g., the global manager application 212). When the logical network configuration is imported to the global namespace, in some embodiments, the entities (e.g., network elements) are created in a special "ON-BOARDING" state, indicating that the entities are not yet fully available on the global manager. When the global manager is ready to use the entities, the "ON-BOARDING" marking is removed from the entities, according to some embodiments.

Once the logical network configuration has been imported to the global namespace, the global on-boarding coordinator updates, at 945, a status of the on-boarding process 900 to "COMPLETE" to indicate that the on-boarding process has been completed. In some embodiments, like for the local manager 120 described above, the global manger updates the status of the on-boarding process following each of the steps 905-940. In some embodiments, the status updates may be viewable to a user (e.g., network administrator) throughout the on-boarding process (e.g., through API responses from the global manager). After updating the status to "COMPLETE", the process sends a notification, at 955, to the local manager to indicate a successful completion of the on-boarding process. The process 900 then ends.

Figure 10:
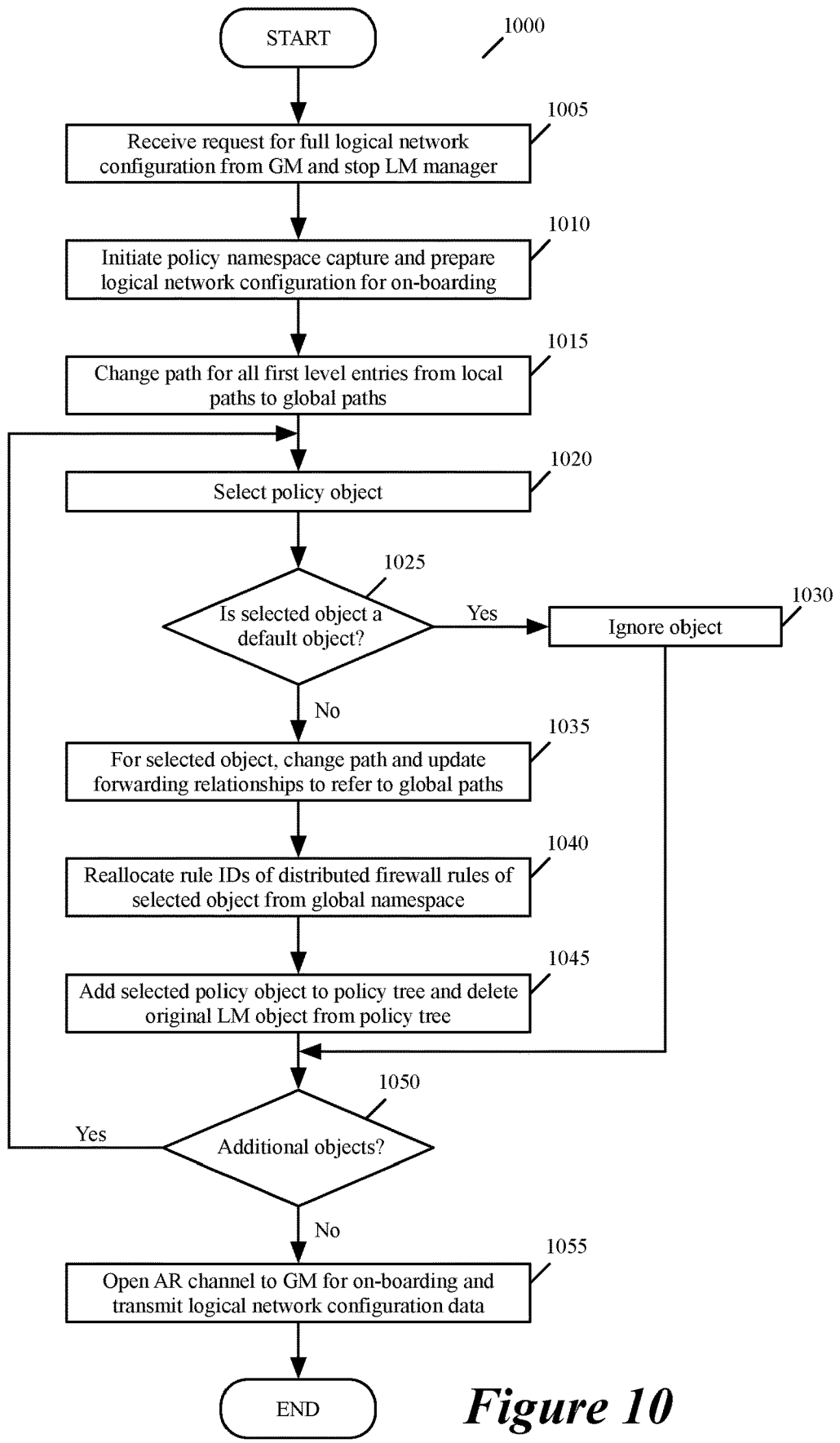
FIG. 10 conceptually illustrates a process of some embodiments for a local manager for a site that provides the logical network configuration to a global manager when the site of the local manager is added to a federation of sites spanned by a global logical network.

FIG. 10 conceptually illustrates a process 1000 of some embodiments for a local manager for a site that provides the logical network configuration to a global manager when the site of the local manager is added to a federation of sites spanned by a global logical network. In some embodiments, the process 1000 is performed by a local manager on-boarding coordinator of the local manager. As shown, the process 1000 starts, at 1005, by receiving a request from the global manager for the entire logical network configuration, and stopping the local manager application of the local manager to prepare the local manager application for on-boarding with the global manager. In some embodiments, the local manager on-boarding coordinator waits until the local manager application is completely stopped before proceeding.

The local manager on-boarding coordinator then initiates, at 1010, a capture process of the logical network configuration to prepare the configuration for on-boarding. In some embodiments, this includes taking a snapshot of the policy tree stored in a datastore of the local manager (e.g., the datastore 740). Based on duplicate first level entries, the local manager on-boarding coordinator changes, at 1015, the paths for all first level entries from "/infra/xxx" to "/global-infra/xxx" to reflect the global paths of the global manager. In other words, the paths for the first level entries are made to refer to objects in the global policy tree rather than the policy tree maintained by the local manager.

Once the path names have been changed, the process selects a policy object (e.g., a set of group policies) from the policy tree at 1020 for processing. In order to process the selected object, the local manager on-boarding coordinator first determines, at 1025, whether the selected object is a default object. When the local manager on-boarding coordinator determines that the selected object is a default object at 1025, the process transitions to 1030 to ignore the selected object, and then transitions to 1050.

Otherwise, when the local manager on-boarding coordinator determines that the selected object is not a default object, the process transitions to 1035 to change the path of the non-default object and update forwarding relationships of the object to refer to global paths (e.g., instead of local paths). In other words, the local manager on-boarding coordinator changes the realization state of the selected object to include the new global manager path, and change the forwarding relationship to the global manager path, according to some embodiments. The process then transitions to 1040.

At 1040, the local manager on-boarding coordinator reallocates rule identifiers of distributed firewall rules associated with the selected object from the global namespace of the local manager application (e.g., local manager application 722). In other words, the local manager on-boarding coordinator changes the rule identifiers for the associated distributed firewall rules from the local manager to the global manager, according to some embodiments. The distributed firewall rules, in some embodiments, include application-based rules (e.g., rules between applications and application tiers), infrastructure-based rules (e.g., rules for shared services), etc. The local manager on-boarding coordinator then adds, at 1045, the selected object to the global policy tree (e.g., global-infra) and deletes the original local manager object (e.g., that still refers to paths of the local manager) from the global policy tree.

The local manager on-boarding coordinator determines, at 1050, whether there are additional policy objects to be processed. When the process determines at 1050 that there are additional policy objects to be processed, the process transitions back to 1020 to select another policy object for processing. Otherwise, when the local manager on-boarding coordinator determines that there are no additional policy objects to be processed, the process transitions to 1055 to open an asynchronous channel (e.g., AR channel 750) to the global manager for on-boarding and transmits the logical network configuration via the asynchronous channel to the global manager. The process 1000 then ends.

In some embodiments, after the local manager is on-boarded, the default domain is translated from the local manager to a location on the global manager. For example, for a local manager that is registered as "site-london", the default domain will be on-boarded as "/infra/domains/default/global-infra/domains/site-london", according to some embodiments. Thus, any other domains on the local manager will not be on-boarded to the global manager, and any entities under them will be on-boarded under the site-specific domain, and the group and security policy names change, in some embodiments, to reflect the new global-infra default domain name.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 11:
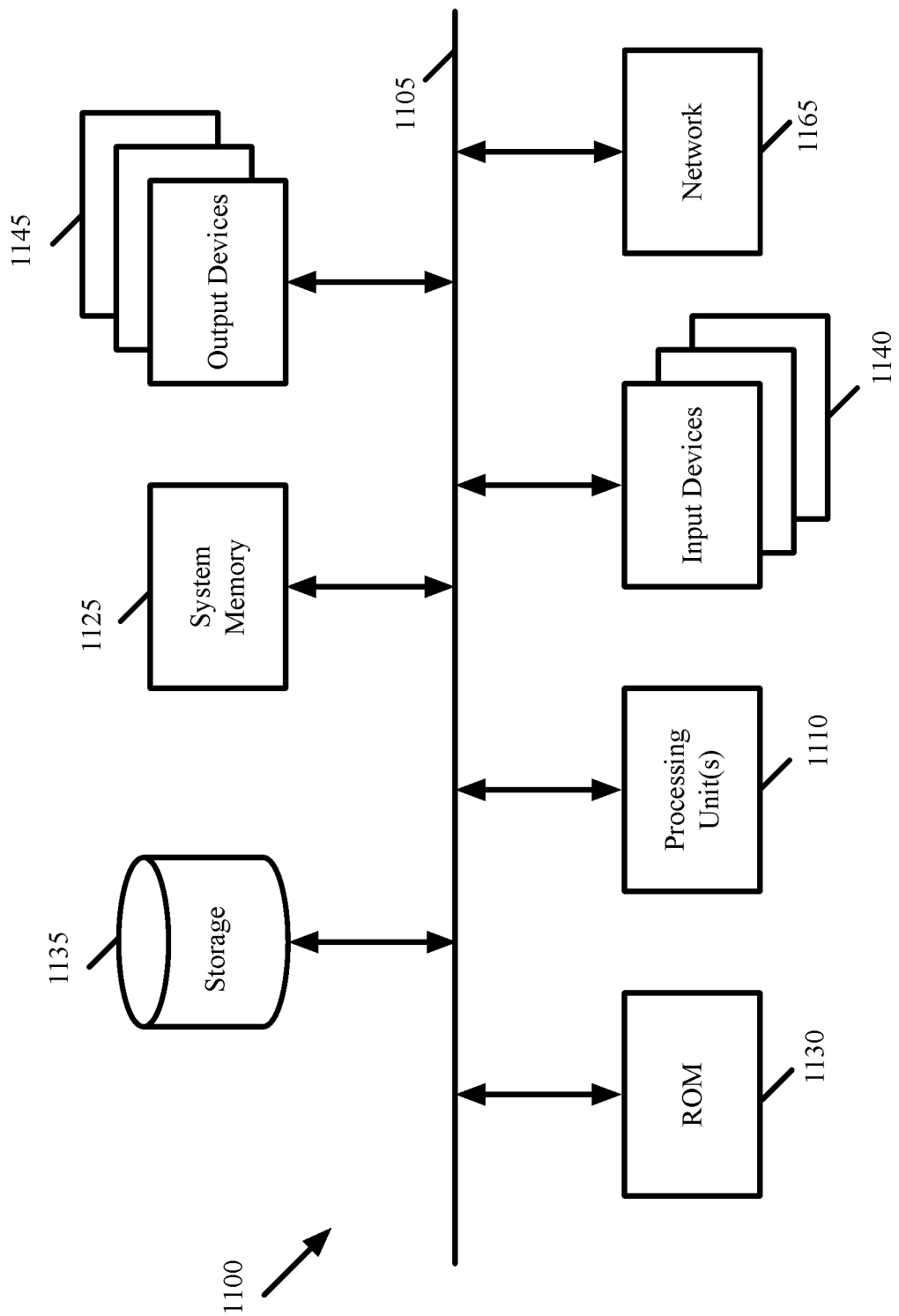
FIG. 11 conceptually illustrates a computer system with which some embodiments of the invention are implemented.

FIG. 11 conceptually illustrates a computer system 1100 with which some embodiments of the invention are implemented. The computer system 1100 can be used to implement any of the above-described hosts, controllers, and managers. As such, it can be used to execute any of the above-described processes. This computer system includes various types of non-transitory machine readable media and interfaces for various other types of machine readable media. Computer system 1100 includes a bus 1105, processing unit(s) 1110, a system memory 1125, a read-only memory 1130, a permanent storage device 1135, input devices 1140, and output devices 1145.

The bus 1105 collectively represents all system, peripheral, and chipset buses that communicatively connect the numerous internal devices of the computer system 1100. For instance, the bus 1105 communicatively connects the processing unit(s) 1110 with the read-only memory 1130, the system memory 1125, and the permanent storage device 1135.

From these various memory units, the processing unit(s) 1110 retrieve instructions to execute and data to process in order to execute the processes of the invention. The processing unit(s) may be a single processor or a multi-core processor in different embodiments. The read-only-memory (ROM) 1130 stores static data and instructions that are needed by the processing unit(s) 1110 and other modules of the computer system. The permanent storage device 1135, on the other hand, is a read-and-write memory device. This device is a non-volatile memory unit that stores instructions and data even when the computer system 1100 is off. Some embodiments of the invention use a mass-storage device (such as a magnetic or optical disk and its corresponding disk drive) as the permanent storage device 1135.

Other embodiments use a removable storage device (such as a floppy disk, flash drive, etc.) as the permanent storage device. Like the permanent storage device 1135, the system memory 1125 is a read-and-write memory device. However, unlike storage device 1135, the system memory is a volatile read-and-write memory, such a random access memory. The system memory stores some of the instructions and data that the processor needs at runtime. In some embodiments, the invention's processes are stored in the system memory 1125, the permanent storage device 1135, and/or the read-only memory 1130. From these various memory units, the processing unit(s) 1110 retrieve instructions to execute and data to process in order to execute the processes of some embodiments.

The bus 1105 also connects to the input and output devices 1140 and 1145. The input devices enable the user to communicate information and select commands to the computer system. The input devices 1140 include alphanumeric keyboards and pointing devices (also called "cursor control devices"). The output devices 1145 display images generated by the computer system. The output devices include printers and display devices, such as cathode ray tubes (CRT) or liquid crystal displays (LCD). Some embodiments include devices such as a touchscreen that function as both input and output devices.

Finally, as shown in FIG. 11, bus 1105 also couples computer system 1100 to a network 1165 through a network adapter (not shown). In this manner, the computer can be a part of a network of computers (such as a local area network ("LAN"), a wide area network ("WAN"), or an Intranet, or a network of networks, such as the Internet. Any or all components of computer system 900 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. Also, several figures (e.g., FIGS. 3 and 8-10) conceptually illustrate processes of some embodiments of the invention. In other embodiments, the specific operations of these processes may not be performed in the exact order shown and described in these figures. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

The invention claimed is:

1. For a global manager that manages a logical network configuration for a plurality of datacenters, each datacenter having a local manager that manages the logical network configuration within the datacenter, a method comprising:
    based on detecting that a connection to a particular local manager of a particular datacenter in the plurality of datacenters has been restored after a period of unavailability, identifying a portion of the logical network configuration that is relevant to the particular datacenter;
    in a series of transactions, transferring the identified portion of the logical network configuration to the particular local manager;
    during the series of transactions, identifying modifications to the identified portion of the logical network configuration to be included in the series of transactions; and
    upon completion of the series of transactions, transferring a notification to the particular local manager indicating completion of the series of transactions.

2. The method of claim 1, wherein transferring the identified portion of the logical network configuration to the particular local manager in a series of transactions comprises:
    capturing a state of the identified portion of the logical network configuration at a particular time as a series of segments, wherein each captured segment is added to a queue to be transferred to the particular local manager; and transferring the captured segments from the queue to the particular local manager in the series of transactions.

3. The method of claim 2, wherein:

the series of segments are captured over a period of time and each segment is added to the queue as the segment is captured; and modifications to the identified portion of the logical network configuration comprise modifications to the state of the identified portion of the logical network configuration during the period of time.

4. The method of claim 3, wherein identifying the modifications comprises adding the modifications to the queue as the modifications are identified.

5. The method of claim 4, wherein the queue further comprises (i) a start marker indicating a start of the period of time and (ii) an end marker indicating an end of the period of time, wherein transferring the notification indicating completion of the series of transactions comprises transferring the end marker.

6. The method of claim 3, wherein (i) the segments comprise sections of tables representing logical network state and (ii) the modifications comprise change log entries specifying changes to the sections of the tables.

7. The method of claim 1, wherein the particular local manager (i) receives and processes each transaction in the series of transactions from the global manager, (ii) receives the notification indicating completion of the series of transactions, and (iii) merges the portion of the logical network configuration and identified modifications received in the series of transactions into a set of logical network configuration data for the particular datacenter after receiving the notification.

8. The method of claim 7, wherein:

the set of logical network configuration data is a first set of logical network configuration data;

prior to connectivity being restored, the local manager stored a second set of logical network configuration data for the particular datacenter; and after merging the portion of the logical network configuration and identified modifications received in the series of transactions into the first set of logical network configuration data, the particular local manager (i) identifies entities from the second set of logical network configuration data that are not in the first set of logical network configuration data and remain in a database of the particular local manager and (ii) deletes the identified entities from the database.

9. The method of claim 8, wherein the particular local manager maintains the second set of logical network configuration data while processing the series of transactions in case of failover at the global manager.

10. The method of claim 7, wherein the particular local manager propagates the set of logical network configuration data to physical network elements of the particular datacenter.

11. The method of claim 7 further comprising sending a notification to the global manager indicating all of the transactions in the series of transactions have been successfully received, processed, and merged.

12. The method of claim 1, wherein the global manager transfers the identified portion of the logical network configuration to the particular local manager using an asynchronous channel, wherein the asynchronous channel maintains a queue of the series of transactions during the transfer until all transactions have been successfully transferred to and processed at the particular datacenter.

13. The method of claim 12, wherein, for each respective local manager of a respective datacenter, the global manager maintains a respective asynchronous channel for communicating with the respective local manager.

14. The method of claim 13, wherein the global manager comprises a plurality of site managers, each respective site manager for (i) managing a respective asynchronous channel corresponding to a respective datacenter and (ii) maintaining connectivity data for the respective datacenter.

15. The method of claim 14, wherein a site manager of the particular datacenter (i) detects, through the asynchronous channel, that the connection to the particular local manager has been restored after the period of unavailability and (ii) requests, from the global manager, the identified portion of the logical network configuration to be transferred to the particular datacenter.

16. The method of claim 15, wherein in response to the request, a broker service of the global manager identifies the portion of the logical network configuration relevant to the particular datacenter.

17. A non-transitory machine readable medium storing a program for a global manager that manages a logical network configuration for a plurality of datacenters, each datacenter having a local manager that manages the logical network configuration within the datacenter, the program executable by at least one processing unit, the program comprising sets of instructions for:

based on detecting that a connection to a particular local manager of a particular datacenter in the plurality of datacenters has been restored after a period of unavailability, identifying a portion of the logical network configuration that is relevant to the particular datacenter;

in a series of transactions, transferring the identified portion of the logical network configuration to the particular local manager;

during the series of transactions, identifying modifications to the identified portion of the logical network configuration to be included in the series of transactions; and upon completion of the series of transactions, transferring a notification to the particular local manager indicating completion of the series of transactions.

18. The non-transitory machine readable medium of claim 17, wherein the set of instructions for transferring the identified portion of the logical network configuration to the particular local manager in a series of transactions comprises sets of instructions for:

capturing a state of the identified portion of the logical network configuration at a particular time as a series of segments, wherein the series of segments are captured over a period of time and each captured segment is added to a queue as the segment is captured in order to be transferred to the particular local manager; and transferring the captured segments from the queue to the particular local manager in the series of transactions, wherein modifications to the identified portion of the logical network configuration are added to the queue as they are identified and comprise modifications to the state of the identified portion of the logical network configuration during the period of time.

19. The non-transitory machine readable medium of claim 18, wherein the queue further comprises (i) a start marker indicating a start of the period of time and (ii) an end marker indicating an end of the period of time, wherein transferring the notification indicating completion of the series of transactions comprises transferring the end marker.

20. The non-transitory machine readable medium of claim 18, wherein (i) the segments comprise sections of tables representing logical network state and (ii) the modifications comprise change log entries specifying changes to the sections of the tables.

21. The non-transitory machine readable medium of claim 17, wherein the particular local manager (i) receives and processes each transaction in the series of transactions from the global manager, (ii) receives the notification indicating completion of the series of transactions, and (iii) merges the portion of the logical network configuration and identified modifications received in the series of transactions into a set of logical network configuration data for the particular datacenter after receiving the notification.

22. The non-transitory machine readable medium of claim 21, wherein:
- the set of logical network configuration data is a first set of logical network configuration data;
- prior to connectivity being restored, the local manager stored a second set of logical network configuration data for the particular datacenter; and
- after merging the portion of the logical network configuration and identified modifications received in the series of transactions into the first set of logical network configuration data, the particular local manager (i) identifies entities from the second set of logical network configuration data that are not in the first set of logical network configuration data and remain in a database of the particular local manager and (ii) deletes the identified entities from the database.

23. The non-transitory machine readable medium of claim 17, wherein
- the global manager transfers the identified portion of the logical network configuration to the particular local manager using an asynchronous channel, wherein the asynchronous channel maintains a queue of the series of transactions during the transfer until all transactions have been successfully transferred to and processed at the particular datacenter, and
- for each respective local manager of a respective datacenter, the global manager maintains a respective asynchronous channel for communicating with the respective local manager.

24. The non-transitory machine readable medium of claim 23,
- wherein the global manager comprises a plurality of site managers, each respective site manager for (i) managing a respective asynchronous channel corresponding to a respective datacenter and (ii) maintaining connectivity data for the respective datacenter, and
- wherein a site manager of the particular datacenter (i) detects, through the asynchronous channel, that the connection to the particular local manager has been restored after the period of unavailability and (ii) requests, from the global manager, the identified portion of the logical network configuration to be transferred to the particular datacenter.

* * * * *